United States Patent

Maruyama et al.

(10) Patent No.: US 10,425,602 B2
(45) Date of Patent: Sep. 24, 2019

(54) IMAGE PROCESSING APPARATUS, IMAGE PROCESSING METHOD, AND COMPUTER-READABLE RECORDING MEDIUM

(71) Applicant: OLYMPUS CORPORATION, Tokyo (JP)

(72) Inventors: Hiroki Maruyama, Hino (JP); Manabu Ichikawa, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/841,825

(22) Filed: Dec. 14, 2017

(65) Prior Publication Data
US 2018/0115728 A1    Apr. 26, 2018

Related U.S. Application Data

(63) Continuation of application No. PCT/JP2015/071176, filed on Jul. 24, 2015.

(51) Int. Cl.
*H04N 5/367* (2011.01)
*H04N 1/409* (2006.01)
(Continued)

(52) U.S. Cl.
CPC ............ *H04N 5/367* (2013.01); *H04N 1/409* (2013.01); *H04N 5/217* (2013.01);
(Continued)

(58) Field of Classification Search
CPC .......... H04N 1/409; H04N 5/21; H04N 5/217; H04N 5/23203; H04N 5/357;
(Continued)

(56) References Cited

U.S. PATENT DOCUMENTS 8,208,046 B2    6/2012    Ogino
8,451,351 B2 *  5/2013    Kitani ................. H04N 5/2355
                                                    348/246
(Continued)

FOREIGN PATENT DOCUMENTS

JP    2002010274 A    1/2002
JP    2012095203 A    5/2012
(Continued)

OTHER PUBLICATIONS

International Search Report dated Oct. 27, 2015 issued in PCT/JP2015/071176.

*Primary Examiner* — Lin Ye
*Assistant Examiner* — Chriss S Yoder, III
(74) *Attorney, Agent, or Firm* — Scully, Scott, Murphy & Presser, P.C.

(57) ABSTRACT

An image processing apparatus includes: an acquisition unit configured to acquire defective pixel information including one of positional information on a reading circuit in which defective pixel noise occurs and positional information on each of pixels, blinking defect noise information including one of positional information on a reading circuit in which blinking defect noise occurs and the positional information on each of the pixels, and image data generated by an image sensor; and a noise reduction unit configured to reduce one of the defective pixel noise and the blinking defect noise based on the defective pixel information acquired by the acquisition unit and the blinking defect noise information acquired by the acquisition unit, with respect to the image data acquired by the acquisition unit.

13 Claims, 23 Drawing Sheets

(51) Int. Cl.
   *H04N 5/378*    (2011.01)
   *H04N 5/217*    (2011.01)
   *H04N 5/232*    (2006.01)
   *H04N 5/21*     (2006.01)

(52) U.S. Cl.
   CPC ......... *H04N 5/23203* (2013.01); *H04N 5/378* (2013.01); *H04N 5/21* (2013.01)

(58) Field of Classification Search
   CPC ...... H04N 5/3575; H04N 5/367; H04N 5/378; G06T 5/002; G06T 2207/10004
   See application file for complete search history.

(56) References Cited

U.S. PATENT DOCUMENTS

| | | |
|---|---|---|
| 8,648,941 B2 | 2/2014 | Kitani |
| 2008/0117318 A1* | 5/2008 | Aoki .................. H04N 5/367 |
| | | 348/246 |
| 2011/0080505 A1* | 4/2011 | Ogino .................. H04N 5/365 |
| | | 348/246 |

FOREIGN PATENT DOCUMENTS

| | | |
|---|---|---|
| JP | 2012105063 A | 5/2012 |
| WO | 2011042948 A1 | 4/2011 |

\* cited by examiner

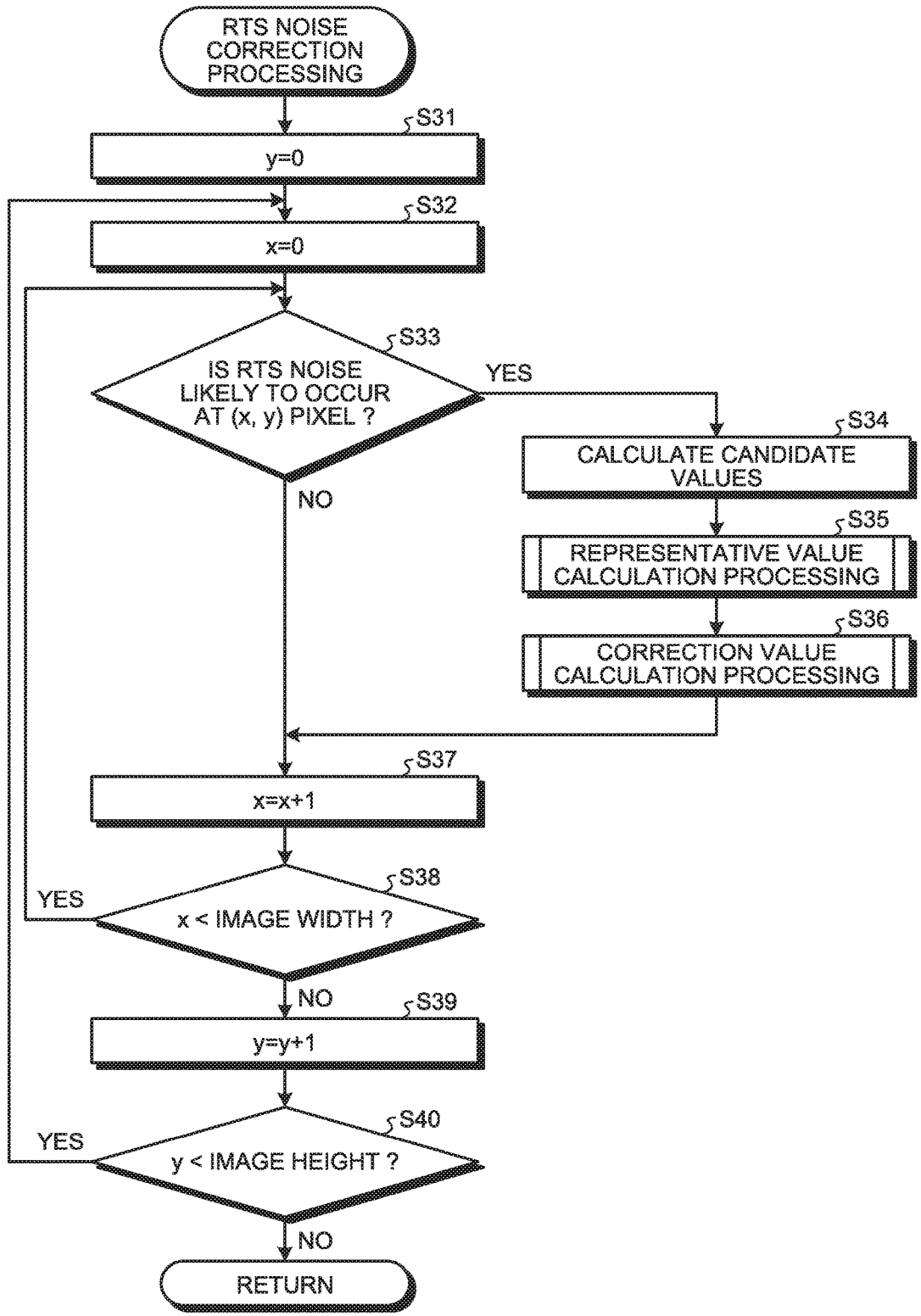

IMAGE PROCESSING APPARATUS, IMAGE PROCESSING METHOD, AND COMPUTER-READABLE RECORDING MEDIUM

CROSS-REFERENCE TO RELATED APPLICATIONS

This application is a continuation of PCT international application Ser. No. PCT/JP2015/071176 filed on Jul. 24, 2015 which designates the United States, incorporated herein by reference.

BACKGROUND

1. Technical Field

The disclosure relates to an image processing apparatus, an image processing method, and a computer-readable recording medium.

2. Related Art

In the related art, in an image sensor, such as a complementary metal oxide semiconductor (CMOS), miniaturization of pixels and a reading circuit for reading signals from the pixels has been developed. Such a miniaturized reading circuit causes reduction in sensitivity and increase in various kinds of noise. To cope with the reduction in sensitivity, a sharing pixel structure is adopted, in which a single reading circuit is shared by a plurality of pixels to read signals, in order to reduce an area required for the circuit in an image sensor and increase an aperture ratio (a percentage of a light-receiving unit) of each of the pixels to thereby improve the sensitivity.

Meanwhile, examples of noise that occurs in the image sensor include dark current shot noise due to a dark current, random noise due to thermal noise or the like in the reading circuit, defective pixel noise (defective pixel) in which a pixel value always shows an abnormal value at least under a certain condition, and blinking defect noise in which a pixel value randomly fluctuates. The defective pixel as mentioned above includes a white spot in which a pixel value is higher than pixel values of neighboring pixels, and a black spot in which a pixel value is lower than pixel values of neighboring pixels. Here, the white spot includes a spot that is always white (brighter than neighboring pixels) and a spot that becomes white (brighter than neighboring pixels) under a specific condition, such as temperature, an exposure amount, or an exposure time. Furthermore, the black spot includes a spot that is always black (darker than neighboring pixels) and a spot that becomes black (darker than neighboring pixels) under a specific condition, such as temperature, an exposure amount, or an exposure time.

In addition, the defective pixel includes a defective pixel caused by a reading circuit. In a case where a sharing pixel structure is adopted, similar defective pixels may occur at all of pixels that share a reading circuit.

As a technology for correcting the defective pixel as described above, there is a known technology in which an average value of neighboring pixels of a pixel of interest is calculated, whether the pixel is a defective pixel is determined based on comparison with the average value, and when it is determined that the pixel is the defective pixel, the defective pixel is replaced with the average value of the neighboring pixels (see JP 2002-10274 A).

In addition, the blinking defect noise as mentioned above includes random telegraph signal (RTS) noise caused by a reading circuit. As a technology for correcting the RTS noise, there is a known technology in which whether there is an influence of the RTS noise on a pixel of interest in a captured image is determined based on a pixel value of the pixel of interest, a pixel value of a neighboring pixel of the pixel of interest, and a noise level of the RTS noise that is detected in advance for each of the pixels of the image sensor (hereinafter, referred to as an "RTS noise level"), and when it is determined that there is an influence of the RTS noise, the RTS noise level is added to or subtracted from the pixel value of the pixel of interest (see JP 2012-105063 A).

SUMMARY

In general, the white spot and the black spot have greater influence on image quality and greater amounts of fluctuation from a value considered as a true value than the RTS noise. Therefore, it is preferable to use a different correction method for each of a defective pixel and a blinking defective pixel.

In addition, a possibility that a defective pixel and a blinking defective pixel are located close to each other in an image sensor increases as the number of defective pixels and blinking defective pixels increases. FIG. 27 is a diagram schematically illustrating each of pixels in a conventional image sensor. As illustrated in FIG. 27, as the number of defective pixels PW1 and blinking defective pixels PR1 in an image sensor 500 increases, the defective pixel PW1 and the blinking defective pixel PR1 may possibly be located adjacent to each other. Therefore, even when each of the defective pixel and the blinking defective pixel is separately corrected by using the technologies of JP 2002-10274 A and JP 2012-105063 A described above, the other noise may exert influence. Furthermore, the RTS noise occurs in units of a sharing block G in the image sensor 500, and therefore when all of the pixels are corrected by assuming that all of the pixels are defective pixels, image quality may be greatly reduced.

As described above, even when each of a defective pixel and a blinking defective pixel in image data generated by an image sensor including a defective pixel and a blinking defective pixel is separately corrected by using the technologies of JP 2002-10274 A and JP 2012-105063 A described above, overcorrection or non-correction may occur, which results in low-accuracy correction.

In some embodiments, provided is an image processing apparatus for correcting blinking defect noise that is contained in image data generated by an image sensor, the image sensor including: a plurality of pixels arranged two-dimensionally and configured to receive light from outside to generate a signal according to an amount of the received light; and a plurality of reading circuits configured to read the signal as a pixel value, and for correcting defective pixel noise that is contained in the image data, the defective pixel noise being different from the blinking defect noise and occurring according to positions of the plurality of pixels. The image processing apparatus includes: an acquisition unit configured to acquire defective pixel information including one of positional information on a reading circuit in which the defective pixel noise occurs and positional information on each of the pixels, blinking defect noise information including one of positional information on a reading circuit in which the blinking defect noise occurs and the positional information on each of the pixels, and the image data generated by the image sensor; and a noise reduction unit configured to reduce one of the defective pixel noise and the blinking defect noise based on the defective pixel information acquired by the acquisition unit and the blinking defect noise information acquired by the acquisition unit, with respect to the image data acquired by the acquisition unit. After reducing one of the defective pixel noise and the blinking defect noise based on the defective pixel information acquired by the acquisition unit and the blinking defect noise information acquired by the acquisition unit with respect to the image data acquired by the acquisition unit, the noise reduction unit is configured to reduce another one of the defective pixel noise and the blinking defect noise based on at least one of the defective pixel information acquired by the acquisition unit and the blinking defect noise information acquired by the acquisition unit.

In some embodiments, provided is an image processing method performed by an image processing apparatus for correcting blinking defect noise that is contained in image data generated by an image sensor, the image sensor including: a plurality of pixels arranged two-dimensionally and configured to receive light from outside to generate a signal according to an amount of the received light; and a plurality of reading circuits configured to read the signal as a pixel value, and for correcting defective pixel noise that is contained in the image data, the defective pixel noise being different from the blinking defect noise and occurring according to positions of the plurality of pixels. The image processing method includes: acquiring defective pixel information including one of positional information on a reading circuit in which the defective pixel noise occurs and positional information on each of the pixels, blinking defect noise information including one of positional information on a reading circuit in which the blinking defect noise occurs and the positional information on each of the pixels, and the image data generated by the image sensor; and reducing one of the defective pixel noise and the blinking defect noise based on the defective pixel information acquired at the acquiring and the blinking defect noise information acquired at the acquiring, with respect to the image data acquired at the acquiring. The reducing includes, after reducing one of the defective pixel noise and the blinking defect noise based on the defective pixel information acquired at the acquiring and the blinking defect noise information acquired at the acquiring with respect to the image data acquired at the acquiring, reducing another one of the defective pixel noise and the blinking defect noise based on at least one of the defective pixel information acquired at the acquiring and the blinking defect noise information acquired at the acquiring.

In some embodiments, provided is a non-transitory computer-readable recording medium recording a program. The program causes an image processing apparatus for correcting blinking defect noise that is contained in image data generated by an image sensor, the image sensor including: a plurality of pixels arranged two-dimensionally and configured to receive light from outside to generate a signal according to an amount of the received light; and a plurality of reading circuits configured to read the signal as a pixel value, and for correcting defective pixel noise that is contained in the image data, the defective pixel noise being different from the blinking defect noise and occurring according to positions of the plurality of pixels, to execute: acquiring defective pixel information including one of positional information on a reading circuit in which the defective pixel noise occurs and positional information on each of the pixels, blinking defect noise information including one of positional information on a reading circuit in which the blinking defect noise occurs and the positional information on each of the pixels, and the image data generated by the image sensor; and reducing one of the defective pixel noise and the blinking defect noise based on the defective pixel information acquired at the acquiring and the blinking defect noise information acquired at the acquiring, with respect to the image data acquired at the acquiring. The reducing includes, after reducing one of the defective pixel noise and the blinking defect noise based on the defective pixel information acquired at the acquiring and the blinking defect noise information acquired at the acquiring with respect to the image data acquired at the acquiring, reducing another one of the defective pixel noise and the blinking defect noise based on at least one of the defective pixel information acquired at the acquiring and the blinking defect noise information acquired at the acquiring.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 9 is a flowchart illustrating an outline of RTS noise correction processing in FIG. 6;

DETAILED DESCRIPTION

Modes for carrying out the disclosure (hereinafter, referred to as "embodiment(s)") will be described below with reference to the drawings. The disclosure is not limited by the embodiments below. The same components are denoted by the same reference signs throughout the drawings.

First Embodiment

Configuration of Imaging System

Figure 1:
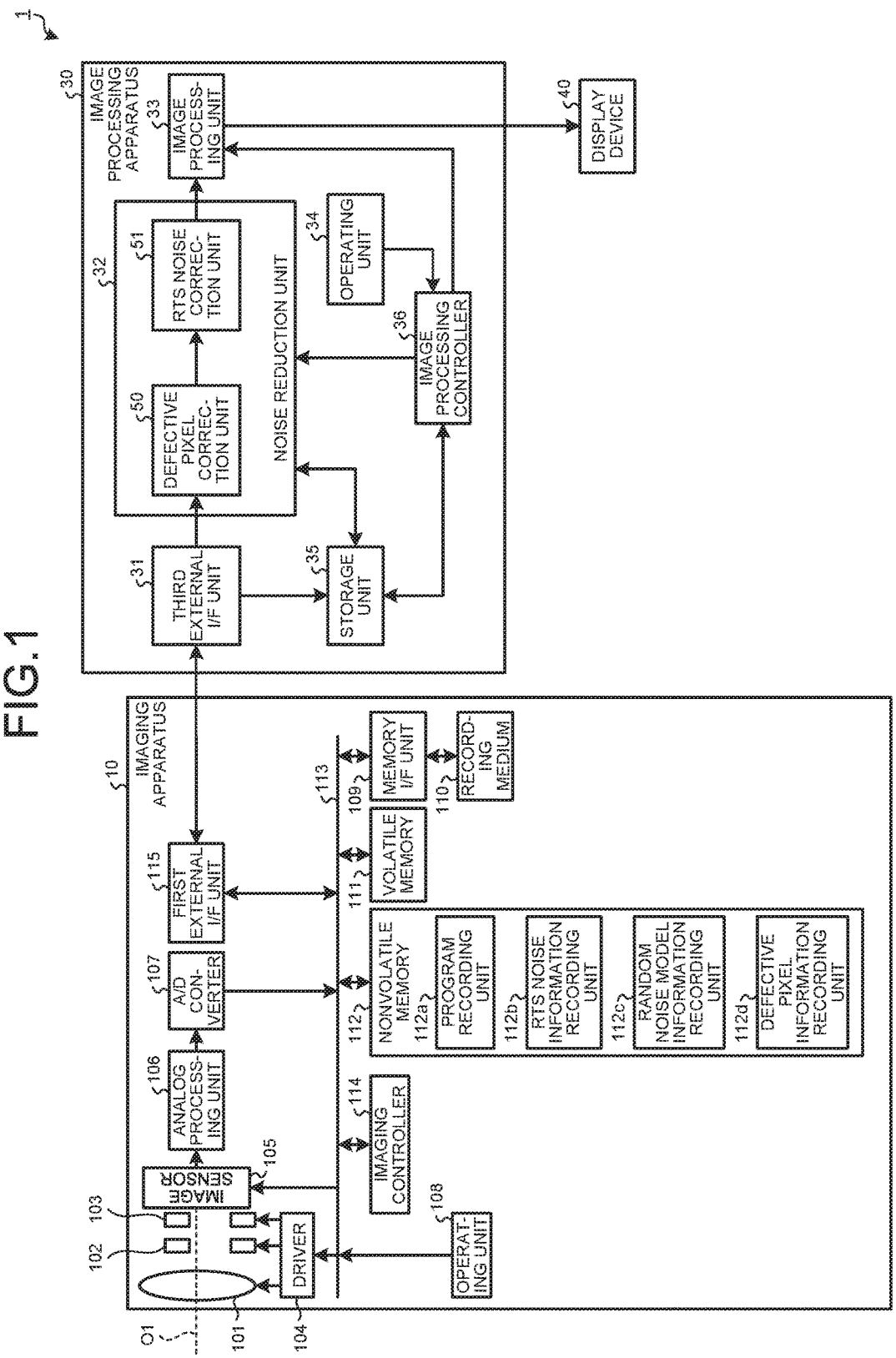
FIG. 1 is a block diagram schematically illustrating a configuration of an imaging system according to a first embodiment of the disclosure.

FIG. 1 is a block diagram schematically illustrating a configuration of an imaging system according to a first embodiment of the disclosure. An imaging system 1 illustrated in FIG. 1 includes an imaging apparatus 10, an image processing apparatus 30, and a display device 40.

Configuration of Imaging Apparatus

First, a configuration of the imaging apparatus 10 will be described. As illustrated in FIG. 1, the imaging apparatus 10 includes an optical system 101, a diaphragm 102, a shutter 103, a driver 104, an image sensor 105, an analog processing unit 106, an A/D converter 107, an operating unit 108, a memory I/F unit 109, a recording medium 110, a volatile memory 111, a nonvolatile memory 112, a bus 113, an imaging controller 114, and a first external I/F unit 115.

The optical system 101 is constituted by one or more lenses. The optical system 101 is constituted by, for example, a focus lens and a zoom lens.

The diaphragm 102 adjusts exposure by limiting an incident amount of light collected by the optical system 101. The diaphragm 102 limits the incident amount of light collected by the optical system 101 under the control of the imaging controller 114 to be described later. It may be possible to control the incident amount of light by using the shutter 103 or an electronic shutter in the image sensor 105 without using the diaphragm 102. The optical system 101 and the diaphragm 102 may be detachably attached to the imaging apparatus 10.

The shutter 103 sets a state of the image sensor 105 to an exposure state or a light blocking state. The shutter 103 is constituted by, for example, a focal plane shutter or the like. It may be possible to use the electronic shutter in the image sensor 105 without using the shutter 103.

The driver 104 drives the optical system 101, the diaphragm 102, and the shutter 103 under the control of the imaging controller 114 to be described later. For example, the driver 104 moves the optical system 101 along an optical axis O1 to change a zoom magnification or adjust a focus position of the imaging apparatus 10.

The image sensor 105 receives light collected by the optical system 101, converts the light into image data (electrical signal), and outputs the image data under the control of the imaging controller 114 to be described later. The image sensor 105 is constituted by a complementary metal oxide semiconductor (CMOS) having a plurality of pixels arranged two-dimensionally, or the like. An RGB filter of Bayer arrangement is arranged in front of each of the pixels. The image sensor 105 is not limited to the Bayer arrangement, and may be a stacked type such as Foveon, for example. The filter to be used is not limited to RGB, and an arbitrary filter, such as a complementary color filter, may be applied. It may be possible to separately arrange a light source capable of applying different color light in a time division manner without arranging a filter in the image sensor 105, and form a color image by using sequentially fetched images while changing a color to be applied. The image sensor 105 has an electronic shutter function capable of electronically controlling an amount of received light.

Figure 2:
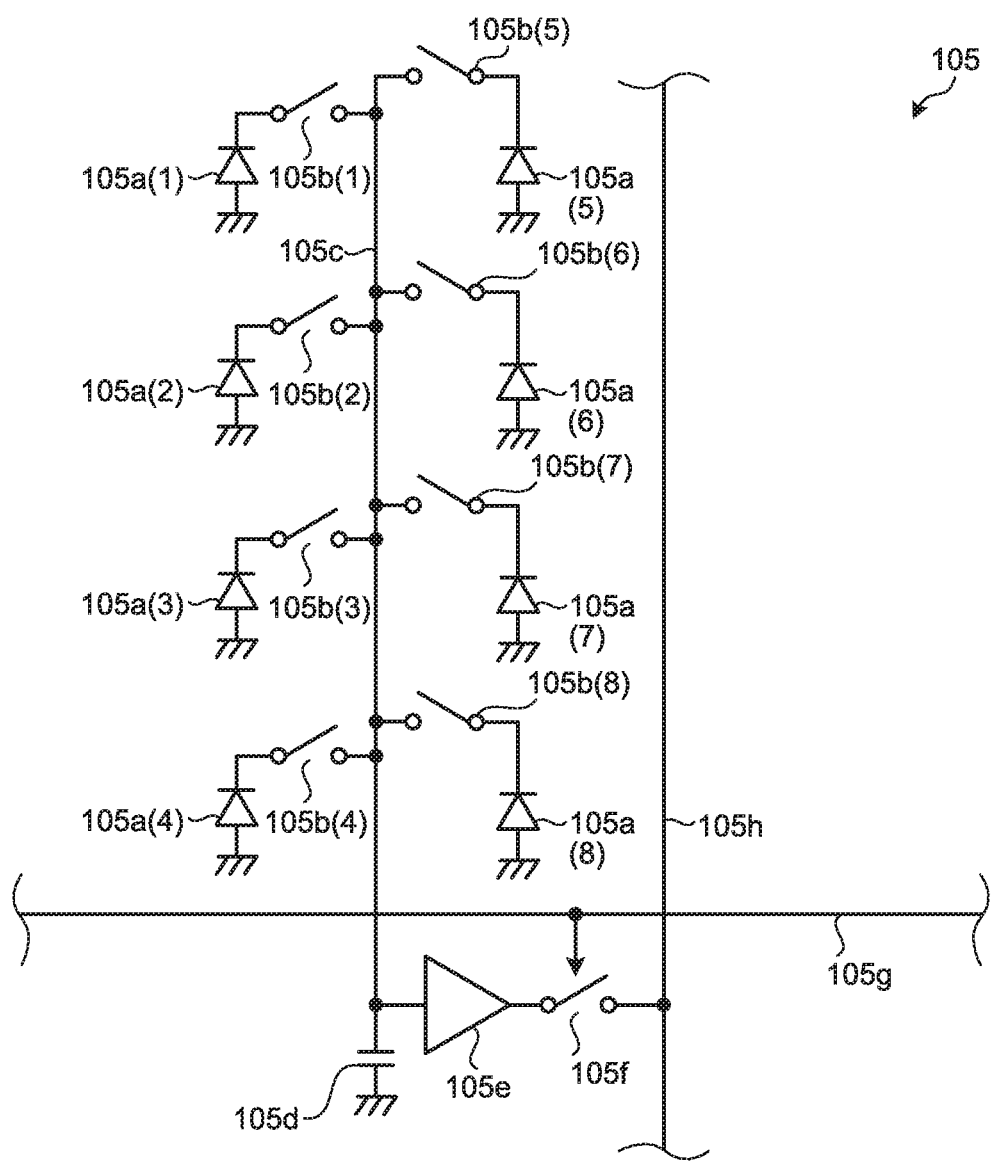
FIG. 2 is a schematic view illustrating a main part of an image sensor included in an imaging apparatus according to the first embodiment of the disclosure.

A configuration of the image sensor 105 will be described in detail below. FIG. 2 is a schematic view illustrating a main part of the image sensor 105. The image sensor 105 illustrated in FIG. 2 is an example in which a reading circuit is shared by a plurality of pixels in order to improve aperture ratios of the pixels to thereby improve sensitivity. In the image sensor 105 illustrated in FIG. 2, a single reading circuit is arranged for eight pixels, i.e., two pixels in a horizontal direction (lateral direction)×four pixels in a vertical direction (longitudinal direction). In FIG. 2, an example is illustrated in which a single group is formed by a single reading circuit and eight pixels, i.e., two pixels in the horizontal direction (lateral direction)×four pixels in the vertical direction (longitudinal direction); however, it is assumed that the pixels and the reading circuit as described above are arranged side by side in the horizontal direction and the vertical direction on the image sensor 105 of the first embodiment.

As illustrated in FIG. 2, the image sensor 105 includes a plurality of pixels (photodiodes) 105a that receive light by exposure and perform photoelectric conversion to generate charges corresponding to the exposure amounts, first switches 105b that are provided on the respective pixels 105a and opened and closed according to the control of the imaging controller 114, a vertical transfer line 105c that vertically transfers a signal (charge) output from each of the pixels 105a, a floating diffusion (FD) unit 105d that accumulates the signal output from each of the pixels 105a, an amplification unit 105e that amplifies a signal output from the FD unit 105d, a second switch 105f that is opened and closed according to the control of the imaging controller 114, a control line 105g that controls the second switch 105f, and a transfer line 105h that transfers an electrical signal amplified by the amplification unit 105e.

When reading signals corresponding to exposure amounts in the pixels 105a(1) to 105a(8) as pixel values, the image sensor 105 configured as described above sets the FD unit 105d to a reset state and the imaging controller 114 turns on only the first switch 105b(1), so that a charge generated in the pixel 105a(1) is transferred to the FD unit 105d. Thereafter, the imaging controller 114 turns on the second switch 105f, and the image sensor 105 causes the amplification unit 105e to amplify the charge accumulated in the FD unit 105d and reads (outputs) the amplified charge as a pixel value. Subsequently, the image sensor 105 sets the FD unit 105d to the reset state and the imaging controller 114 turns on only the first switch 105b(2), so that a charge generated in the pixel 105a(2) is transferred to the FD unit 105d. Thereafter, the imaging controller 114 turns on the second switch 105f, and the image sensor 105 causes the amplification unit 105e to amplify the charge accumulated in the FD unit 105d and reads the amplified charge as a pixel value. By sequentially performing read operations as described above, the image sensor 105 can sequentially output signals corresponding to the exposure amounts in the pixels 105a(1) to 105a(8) as pixel values. In the first embodiment, the amplification unit 105e functions as a reading circuit that reads a charge from each of the pixels 105a.

Referring back to FIG. 1, the explanation of the configuration of the imaging apparatus 10 will be continued.

The analog processing unit 106 performs predetermined analog processing on an analog signal input from the image sensor 105, and outputs the processed signal to the A/D converter 107. Specifically, the analog processing unit 106 performs noise reduction processing, gain up processing, or the like on the analog signal input from the image sensor 105. For example, the analog processing unit 106 performs waveform shaping after reducing reset noise or the like with respect to the analog signal, and then increases gain so as to achieve target brightness.

The A/D converter 107 generates digital image data (hereinafter, referred to as "RAW image data") by performing A/D conversion on the analog signal input from the analog processing unit 106, and outputs the RAW image data to the volatile memory 111 via the bus 113. The A/D converter 107 may directly output the RAW image data to each of the units of the imaging apparatus 10 to be described later. The analog processing unit 106 and the A/D converter 107 as described above may be provided in the image sensor 105, and the image sensor 105 may directly output digital RAW image data.

The operating unit 108 gives various instructions on the imaging apparatus 10. Specifically, the operating unit 108 includes a power switch that changes a power supply state of the imaging apparatus 10 to an ON state or an OFF state, a release switch that gives an instruction to capture a still image, an operation switch that switches between various settings of the imaging apparatus 10, a moving image switch that gives an instruction to capture a moving image, and the like.

The recording medium 110 is constituted by a memory card externally attached to and detached from the imaging apparatus 10, and detachably attached to the imaging apparatus 10 via the memory I/F unit 109. The recording medium 110 may output programs and various kinds of information to the nonvolatile memory 112 via the memory I/F unit 109 under the control of the imaging controller 114.

The volatile memory 111 temporarily stores image data input from the A/D converter 107 via the bus 113. For example, the volatile memory 111 temporarily stores image data sequentially output by the image sensor 105 frame by frame via the analog processing unit 106, the A/D converter 107, and the bus 113. The volatile memory 111 is constituted by a synchronous dynamic random access memory (SDRAM) or the like.

The nonvolatile memory 112 is constituted by a flash memory or the like, and records various programs for operating the imaging apparatus 10 and various kinds of data used during execution of the programs. The nonvolatile memory 112 includes a program recording unit 112a, an RTS noise information recording unit 112b that records RTS noise information, in which positional information on the reading circuit (the amplification unit 105e) for reading a pixel value or positional information on each of the pixels 105a is associated with feature data related to RTS noise caused by the reading circuit (the amplification unit 105e), a random noise model information recording unit 112c that records one or more random noise models, and a defective pixel information recording unit 112d that records positional information on a defective pixel corresponding to a position of a pixel in the image sensor 105 (the positional information includes one or both of the positional information on the reading circuit (the amplification unit 105e) for reading a pixel value and positional information on a pixel at which a defective pixel occurs). Here, the feature data is any one of the amplitude of the RTS noise (RTS_Value), the occurrence frequency of blinking defect noise, and the occurrence frequency in the RTS noise less than the amplitude of the RTS noise.

The bus 113 is constituted by a transmission path or the like that connects constituent parts of the imaging apparatus 10, and transfers various kinds of data generated inside the imaging apparatus 10 to each of the constituent parts of the imaging apparatus 10.

The imaging controller 114 is constituted by a central processing unit (CPU) or the like, and comprehensively controls operations of the imaging apparatus 10 by issuing instructions or transferring data to each of the units of the imaging apparatus 10 in accordance with a command signal or a release signal from the operating unit 108. For example, when a second release signal is input from the operating unit 108, the imaging controller 114 starts to control an imaging operation in the imaging apparatus 10. Here, the imaging operation in the imaging apparatus 10 is a predetermined processing operation performed by the analog processing unit 106 and the A/D converter 107 with respect to an exposure timing of the image sensor 105, an output timing of the analog signal, and the analog signal output from the image sensor 105. The image data subjected to the processing as described above is recorded in the recording medium 110 via the bus 113 and the memory I/F unit 109 under the control of the imaging controller 114.

The first external I/F unit 115 outputs information input from an external apparatus via the bus 113 to the nonvolatile memory 112 or the volatile memory 111, and outputs information stored in the volatile memory 111, information stored in the nonvolatile memory 112, and image data generated by the image sensor 105 to an external apparatus via the bus 113. Specifically, the first external I/F unit 115 outputs image data generated by the image sensor 105, RTS noise information, random noise model information, and positional information on a defective pixel to the image processing apparatus 30 via the bus 113.

Configuration of Image Processing Apparatus

Next, a configuration of the image processing apparatus 30 will be described. The image processing apparatus 30 includes a third external I/F unit 31, a noise reduction unit 32, an image processing unit 33, an operating unit 34, a storage unit 35, and an image processing controller 36.

The third external I/F unit 31 operates as an acquisition unit that acquires, via the first external I/F unit 115 of the imaging apparatus 10, image data generated by the image sensor 105, RTS noise information on RTS noise recorded in the RTS noise information recording unit 112b inside the nonvolatile memory 112, random noise model information recorded in the random noise model information recording unit 112c, and defective pixel information from the defective pixel information recording unit 112d, and outputs the image data, the RTS noise information, the random noise model information, and the defective pixel information acquired as above to the noise reduction unit 32 and the storage unit 35. The third external I/F unit 31 and the first external I/F unit 115 are connected via a control cable, wireless communication, or the like capable of exchanging information bidirectionally, for example. In the first embodiment, the third external I/F unit 31 functions as an acquisition unit.

The noise reduction unit 32 first corrects a defective pixel and then corrects RTS noise in a RAW image input from the third external I/F unit 31, and outputs the corrected RAW image to the image processing unit 33. The noise reduction unit 32 includes a defective pixel correction unit 50 and an RTS noise correction unit 51.

The defective pixel correction unit 50 corrects a pixel value of a defective pixel based on the defective pixel information input from the third external I/F unit 31 with respect to the RAW image input from the third external I/F unit 31, and outputs the corrected RAW image to the RTS noise correction unit 51.

The RTS noise correction unit 51 performs RTS noise correction processing for correcting RTS noise based on the defective pixel information input from the third external I/F unit 31 with respect to the RAW image in which the defective pixel has been corrected and which is input from the defective pixel correction unit 50, and outputs the corrected RAW image to the image processing unit 33.

Figure 3:
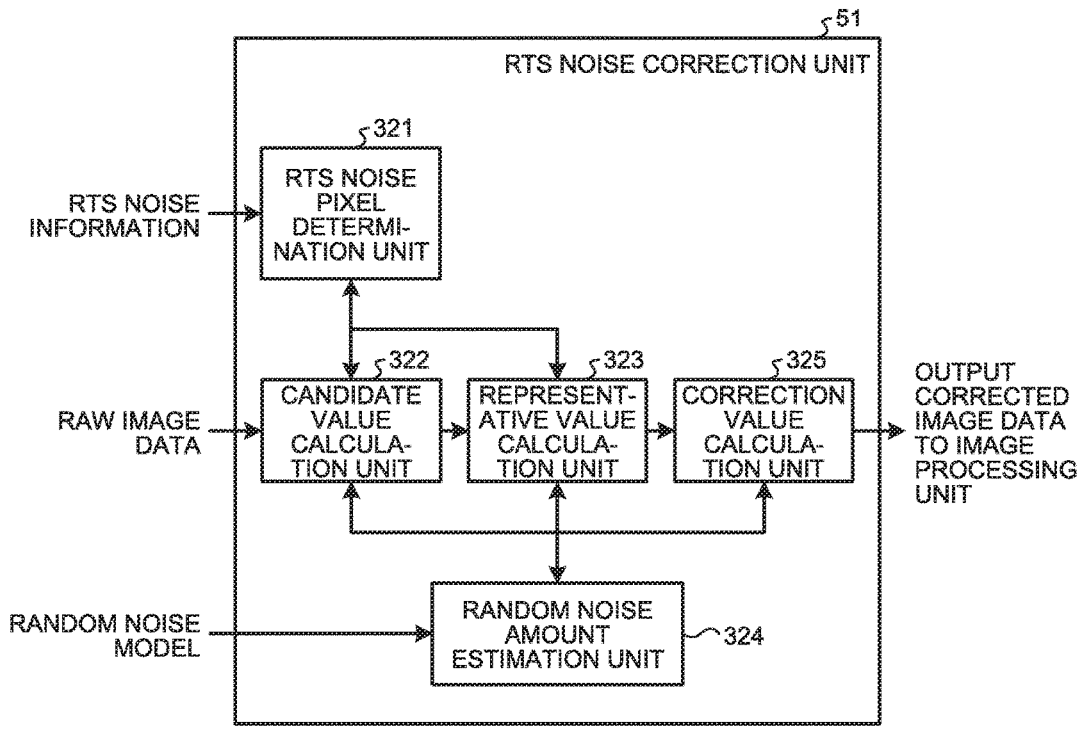
FIG. 3 is a block diagram illustrating a detailed configuration of an RTS noise correction unit according to the first embodiment of the disclosure.

A detailed configuration of the RTS noise correction unit 51 will be described below. FIG. 3 is a block diagram illustrating the detailed configuration of the RTS noise correction unit 51. As illustrated in FIG. 3, the RTS noise correction unit 51 includes an RTS noise pixel determination unit 321, a candidate value calculation unit 322, a representative value calculation unit 323, a random noise amount estimation unit 324, and a correction value calculation unit 325.

The RTS noise pixel determination unit 321 determines whether RTS noise is likely to occur at a pixel on the RAW image input from the third external I/F unit 31, and outputs a determination result to the candidate value calculation unit 322 and the representative value calculation unit 323. Specifically, when a position of a pixel is input to the RTS noise pixel determination unit 321, it is determined whether the RTS noise information corresponding to this pixel is recorded in the RTS noise information recording unit 112b of the imaging apparatus 10. When the RTS noise information is recorded, RTS noise information (information indicating presence of the RTS noise) is output based on the assumption that the pixel is an RTS noise pixel. In contrast, when the RTS noise information is not recorded in the RTS noise information recording unit 112b of the imaging apparatus 10, the RTS noise information is not output based on the assumption that the RTS noise does not occur at the pixel.

When the RTS noise pixel determination unit 321 determines that the RTS noise is likely to occur at a pixel of interest, the candidate value calculation unit 322 calculates a plurality of candidate values for a correction amount with respect to a pixel value of the pixel of interest based on the pixel value of the pixel of interest and the determination result obtained by the RTS noise pixel determination unit 321, and outputs the pixel value of the pixel of interest and the plurality of calculated candidate values to each of the representative value calculation unit 323, the random noise amount estimation unit 324, and the correction value calculation unit 325.

When the RTS noise pixel determination unit 321 determines that the RTS noise is likely to occur at the pixel of interest, the representative value calculation unit 323 calculates a representative value corresponding to a pixel value for which the RTS noise does not occur, based on at least a pixel for which the RTS noise pixel determination unit 321 has determined that the RTS noise does not occur among neighboring pixels of the pixel of interest, and based on a reference value of a random noise amount which corresponds to the pixel of interest and which is calculated by the random noise amount estimation unit 324 to be described later. The representative value calculation unit 323 outputs the pixel value of the pixel of interest, the plurality of candidate values, and the representative value calculated as above to the correction value calculation unit 325. In the first embodiment, the representative value calculation unit 323 functions as an estimation unit.

The random noise amount estimation unit 324 estimates a random noise amount corresponding to a pixel value based on the random noise model recorded in the random noise model information recording unit 112c of the imaging apparatus 10, and outputs an estimation result to each of the candidate value calculation unit 322, the representative value calculation unit 323, and the correction value calculation unit 325. That is, when a pixel value is input to the random noise amount estimation unit 324, the random noise amount corresponding to the pixel value is output.

When the RTS noise pixel determination unit 321 determines that the pixel of interest is a pixel at which RTS noise is likely to occur, the correction value calculation unit 325 corrects the pixel value of the pixel of interest based on the plurality of candidate values calculated by the candidate value calculation unit 322. Specifically, the correction value calculation unit 325 calculates a pixel value for which the RTS noise is corrected, based on the pixel value of the pixel of interest, the plurality of candidate values calculated by the candidate value calculation unit 322, and the representative value calculated by the representative value calculation unit 323, and outputs the calculated pixel value to the image processing unit 33. More specifically, the correction value calculation unit 325 corrects the pixel value of the pixel of interest based on a candidate value for which a correction result is the closest to the representative value calculated by the representative value calculation unit 323 among the plurality of candidate values calculated by the candidate value calculation unit 322. In contrast, when the RTS noise pixel determination unit 321 determines that the pixel of interest is a pixel at which RTS noise does not occur, the correction value calculation unit 325 outputs the pixel value of the pixel of interest as it is.

Referring back to FIG. 1, the explanation of the image processing apparatus 30 will be continued.

The image processing unit 33 performs predetermined image processing on the image data in which noise is corrected by the noise reduction unit 32, and outputs the processed image data to the display device 40. Here, the predetermined image processing executes basic image processing including at least optical black subtraction processing and white balance adjustment processing and further including image data synchronization processing, color matrix calculation processing, gamma correction processing, color reproduction processing, edge enhancement processing, and the like in a case where the image sensor 105 has Bayer arrangement. The image processing unit 33 also performs image processing for reproducing a natural image based on preset parameters of each image processing. Here, the parameters of each image processing are values of contrast, sharpness, saturation, white balance, and gradation.

The operating unit 34 receives input of various operation signals related to the image processing apparatus 30. The operating unit 34 is constituted by, for example, a directional button, a push button, a touch panel, or the like.

The storage unit 35 is constituted by a volatile memory or a nonvolatile memory, and stores the RTS noise information and the defective pixel information output from the third external I/F unit 31.

The image processing controller 36 comprehensively controls each of the units included in the image processing apparatus 30. The image processing controller 36 is constituted by a central processing unit (CPU) or the like. The image processing controller 36 controls instructions, transfer of data, or the like to each of the units included in the image processing apparatus 30.

Configuration of Display Device

Next, a configuration of the display device 40 will be described. The display device 40 displays an image corresponding to image data input from the image processing apparatus 30. The display device 40 is constituted by a display panel made of liquid crystal, organic electro luminescence (EL), or the like.

In the imaging system 1 configured as described above, the image processing apparatus 30 corrects a defective pixel and/or RTS noise that occurs in the image sensor 105, and the display device 40 displays an image corresponding to image data on which image processing is performed by the image processing apparatus 30.

Cause and Characteristics of RTS Noise

Next, a cause of the RTS noise and characteristics of the RTS noise will be described.

Figure 4:
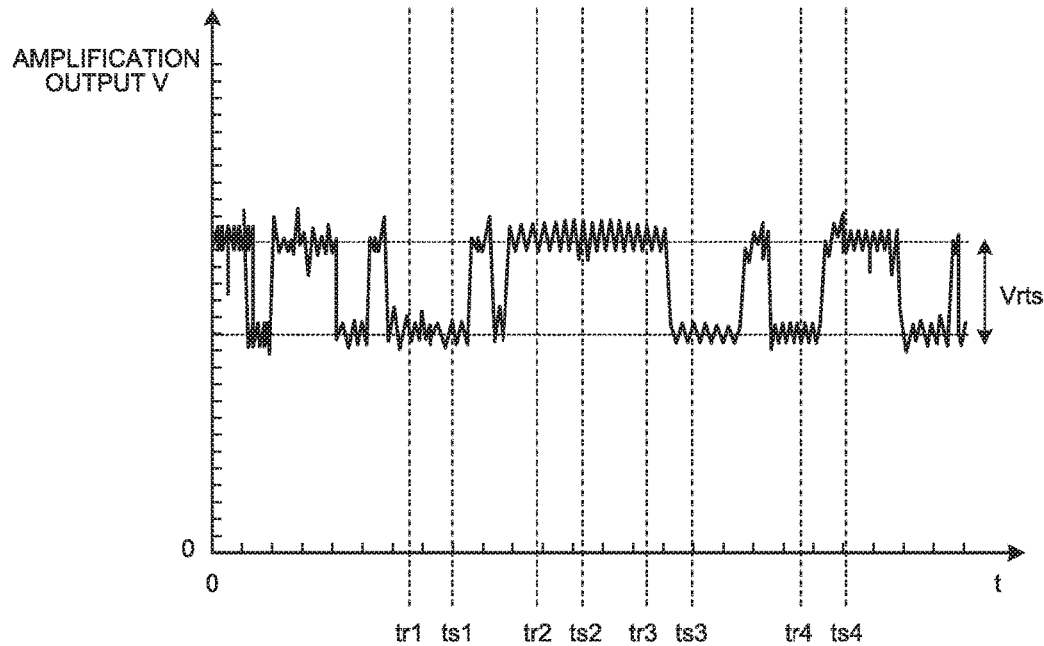
FIG. 4 is a diagram illustrating an example of fluctuation in an amplification output that is output from an amplification unit when RTS noise occurs in a case where light is blocked so that light does not hit the image sensor according to the first embodiment of the disclosure.
Figure 5:
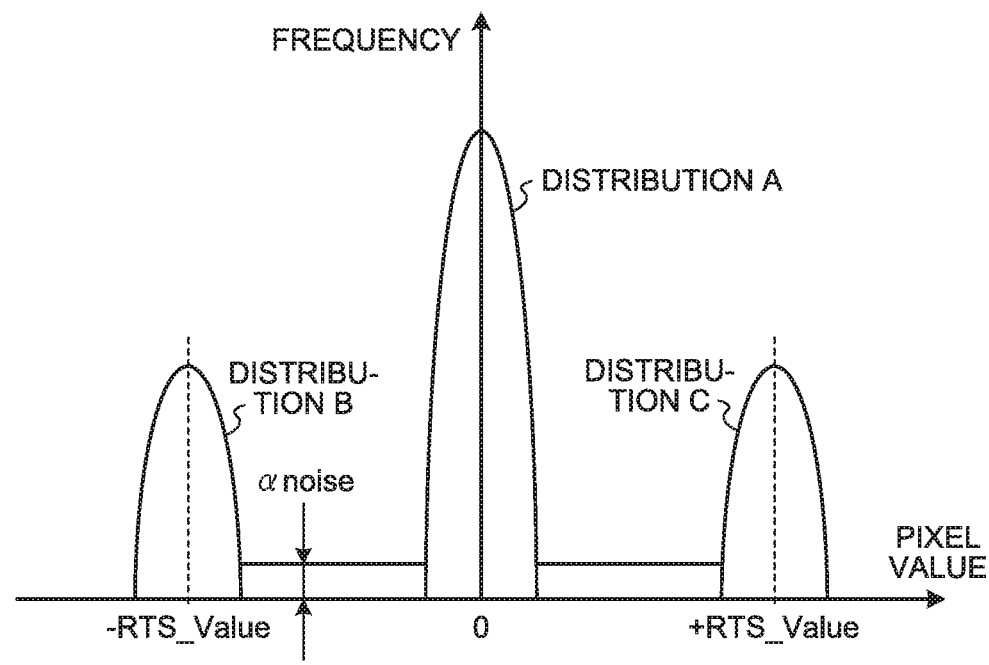
FIG. 5 is a diagram illustrating an example of a distribution of a pixel value that is read by using an amplification unit where RTS noise occurs according to the first embodiment of the disclosure.

FIG. 4 is a diagram illustrating an example of fluctuation in an amplification output that is output from the amplification unit 105e when RTS noise occurs in a case where light is blocked so that light does not hit the image sensor 105. FIG. 5 is a diagram illustrating an example of a distribution of a pixel value that is read by using the amplification unit 105e where the RTS noise occurs.

In a case where a trap level is present in a gate oxide film in the amplification unit 105e, the RTS noise occurs when a charge is captured or discharged at the trap level at a random timing. Therefore, as illustrated in FIG. 4, in the amplification unit 105e where RTS noise occurs, the amplification output fluctuates at random within a range of about Vrts. In addition, fluctuation of a potential does not occur instantaneously, but it takes a short period of time T.

In general, in the image sensor 105, correlated double sampling processing (hereinafter referred to as "CDS processing") is performed in order to reduce noise from the pixel value read from the pixel 105a. In the CDS processing, the imaging controller 114 turns on a reset switch (not illustrated) of the image sensor 105 to reset a charge of the FD unit 105d, and the imaging controller 114 turns on the second switch 105f to generate a reset state to read (output) a reset state signal (reference signal). Subsequently, in the CDS processing, the imaging controller 114 turns on only the first switch 105b (or any of the first switches 105b(1) to 105b(8)) to transfer a charge generated at the pixel 105a to the FD unit 105d, generates a read state (output state) in which the second switch 105f is turned on, and reads (outputs) a read state signal. Subsequently, in the CDS processing, a signal obtained by subtracting the reset state signal (reference signal) from the read state signal is converted as a pixel value.

As illustrated in FIG. 4, when the image sensor 105 reads signals at time tr1 (reset state) and time ts1 (read state) through the CDS processing, amplification outputs V at the time tr1 and the time ts1 are substantially the same, so that the read pixel value is mainly influenced by random noise and distributed with the center at zero like a distribution A as illustrated in FIG. 5. Similarly, even at time tr2 (reset state) and time ts2 (read state), the image sensor 105 has substantially the same amplification outputs V at the time tr2 and the time ts2, so that the read pixel value is distributed like the distribution A as illustrated in FIG. 5.

Meanwhile, when the image sensor 105 reads signals at time tr3 (reset state) and time ts3 (read state) through the CDS processing, an amplification output at the time ts3 is about Vrts lower than an amplification output at the time tr3; therefore, when taking a difference between the two signals, the read pixel value is shifted in the minus direction by RTS_Value, which is a pixel value corresponding to Vrts that is a change amount of the amplification output, and is distributed like a distribution B centered at −RTS_Value.

In contrast, when the image sensor 105 reads signals at time tr4 (reset state) and time ts4 (read state) through the CDS processing, an amplification output at the time ts4 is about Vrts higher than an amplification output at the time tr4; therefore, when taking a difference between the two signals, the read pixel value is shifted in the plus direction by RTS_Value, which is the pixel value corresponding to Vrts that is the change amount of the amplification output, and is distributed like a distribution C centered at RTS_Value.

Here, the fluctuation of the amplification output in FIG. 4 occurs with time τ, so that a signal may be read while the potential fluctuates. In this case, an amplification output difference is larger than −Vrts and smaller than Vrts between a read time in the reset state and a read time in the read state. Consequently, a pixel value read from the image sensor 105 is also larger than −RTS_Value and smaller than RTS_Value. It can be assumed that the time τ is substantially constant when conditions (for example, temperature, driving voltage, or the like) of the image sensor 105 are constant; therefore, pixel values larger than −RTS_Value and smaller than RTS_Value occur with the similar probabilities. Here, the occurrence frequency of these pixel values is defined as αnoise. In addition, the distribution B and the distribution C are similar to each other except for median values. Therefore, hereinafter, a ratio of the distribution B or the distribution C to the distribution A is defined as αrts. This αrts increases as a fluctuation cycle of the amplification output of the amplification unit 105e decreases.

The pixel value read by using the amplification unit 105e where the RTS noise occurs through the CDS processing as described above is distributed as illustrated in FIG. 5. Under the condition that the image sensor 105 is exposed to light, the potential in the read state changes according to the exposure amount. However, the change in the potential due to the RTS noise is constant regardless of the exposure amount. That is, the RTS noise is independent of the exposure amount, and has a characteristic of randomly fluctuating with respect to a normal pixel value in a range from −RTS_Value or more and RTS_Value or less. In FIG. 5, the distribution A, the distribution B, and the distribution C are schematically illustrated; however, they are generally obtained as normal distributions.

In addition, the RTS noise is noise caused by the reading circuit (the amplification unit 105e); therefore, when the plurality of pixels 105a share a single reading circuit as illustrated in FIG. 2, RTS noise with similar characteristics occurs in all of the sharing pixels (the pixels 105a(1) to 105a(8)).

In addition to the reading circuit (the amplification unit 105e) illustrated in FIG. 2, RTS noise may also occur in a column amplifier, a source follower, or the like which is shared in the column direction of the image sensor 105. In this case, RTS noise with the similar characteristics occurs in all of pixels in the column direction in which the same column amplifier and the same source follower are shared. In the present embodiment, the disclosed technology is also applicable to RTS noise that occurs in a circuit other than the reading circuit (the amplification unit 105e).

As described above, when a subject is fixed and captured under the same conditions, RTS noise occurs as one type of blinking defect noise that causes a pixel value of a captured image to oscillate (fluctuate) within a certain range (−RTS_Value or more and RTS_Value or less).

Processing Performed by Image Processing Apparatus

Figure 6:
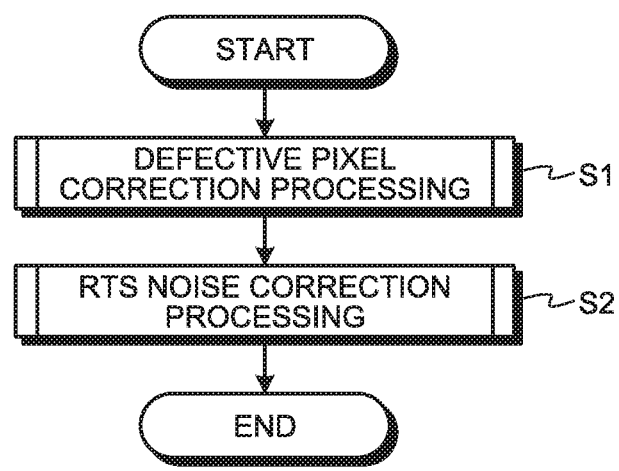
FIG. 6 is a flowchart illustrating an outline of noise correction processing performed by an image processing apparatus according to the first embodiment of the disclosure.

Next, processing performed by the image processing apparatus 30 will be described below. FIG. 6 is a flowchart illustrating an outline of processing performed by the image processing apparatus 30, and is a flowchart of a main routine performed by the image processing apparatus 30.

As illustrated in FIG. 6, the defective pixel correction unit 50 first performs defective pixel correction processing for correcting a defective pixel based on the defective pixel information input from the third external I/F unit 31 with respect to the RAW image input from the third external I/F unit 31 (Step S1). Details of the defective pixel correction processing will be described later.

Subsequently, the RTS noise correction unit 51 performs RTS noise correction processing for correcting RTS noise based on the RTS noise information input from the third external I/F unit 31 with respect to the RAW image in which the defective pixel has been corrected and which is input from the defective pixel correction unit 50 (Step S2). Details of the RTS noise correction processing will be described later. After Step S2, the image processing apparatus 30 ends the processing.

Outline of Defective Pixel Correction Processing

Figure 7:
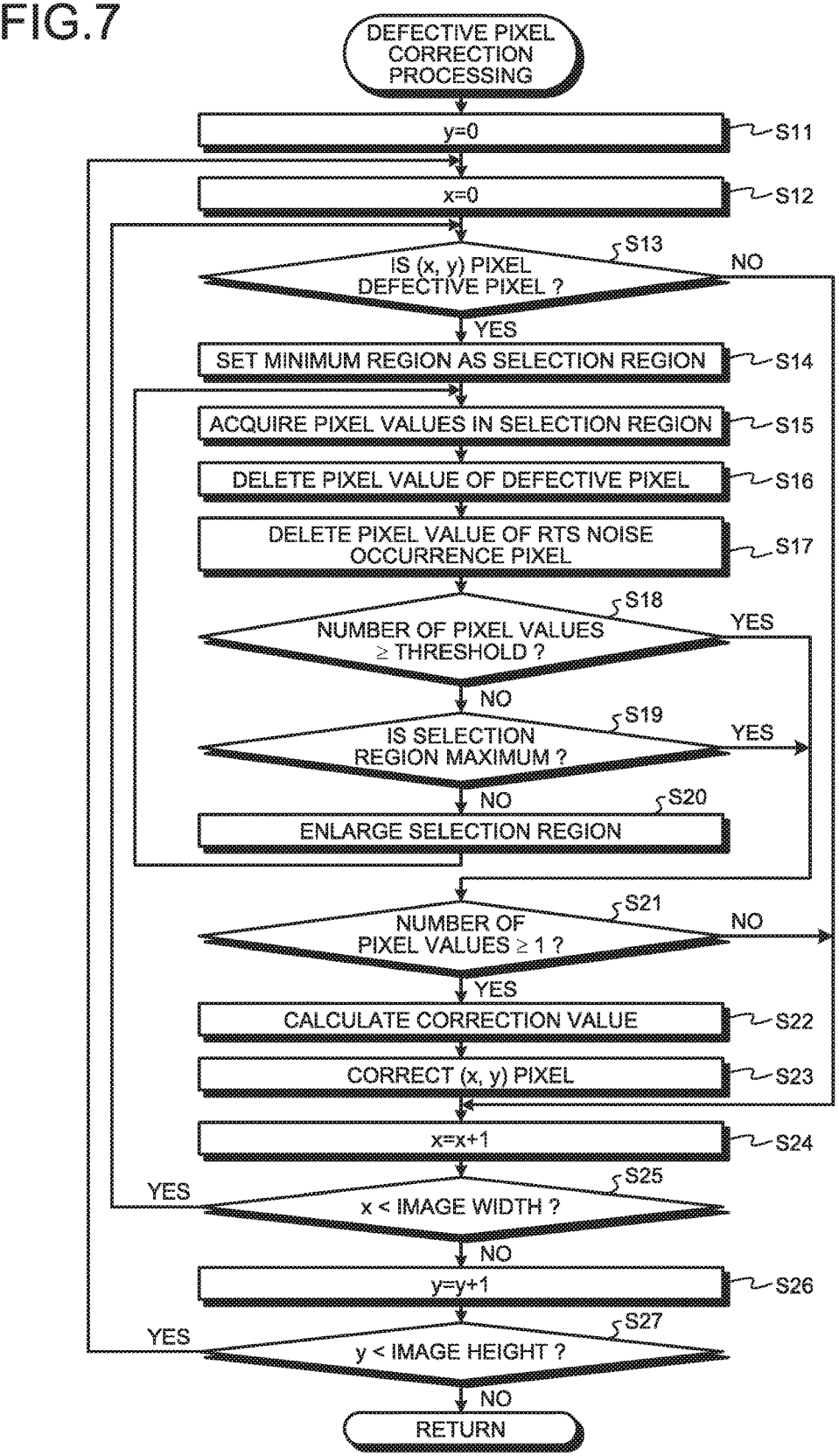
FIG. 7 is a flowchart illustrating an outline of defective pixel correction processing in FIG. 6.

Next, details of the defective pixel correction processing described at Step S1 in FIG. 6 will be explained. FIG. 7 is a flowchart illustrating an outline of the defective pixel correction processing, and is a flowchart of a sub routine performed by the image processing apparatus 30.

As illustrated in FIG. 7, the defective pixel correction unit 50 first resets a counter y indicating a position of a RAW image in a vertical direction (y=0) (Step S11), and resets a counter x indicating a position of the RAW image in a horizontal direction (x=0) (Step S12). Hereinafter, the upper end of the RAW image is set to zero in the counter y indicating the position of the RAW image in the vertical direction, and the left end of the RAW image is set to zero in the counter x indicating the position of the RAW image in the horizontal direction.

Subsequently, the defective pixel correction unit 50 determines whether a pixel of interest ((x, y) pixel) in the RAW image is a defective pixel based on the defective pixel information input from the third external I/F unit 31 (Step S13). When the pixel of interest in the RAW image is a defective pixel (Step S13: Yes), the defective pixel correction unit 50 proceeds to Step S14 to be described below. When the pixel of interest in the RAW image is not a defective pixel (Step S13: No), the defective pixel correction unit 50 proceeds to Step S24 to be described below. At Step S13, the defective pixel correction unit 50 determines that the pixel of interest is a defective pixel when the position of the pixel of interest or a position of a sharing pixel block including the pixel of interest is included in the defective pixel information, and determines that the pixel of interest is not a defective pixel when both of the positions are not included in the defective pixel information.

Figure 8A:
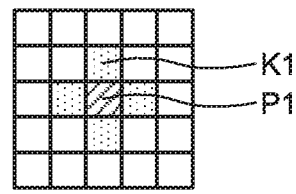
FIG. 8A is a diagram schematically illustrating a selection region (selection region 1) set by a defective pixel correction unit according to the first embodiment of the disclosure.
Figure 8B:
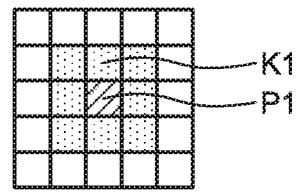
FIG. 8B is a diagram schematically illustrating a selection region (selection region 2) set by a defective pixel correction unit according to the first embodiment of the disclosure.
Figure 8C:
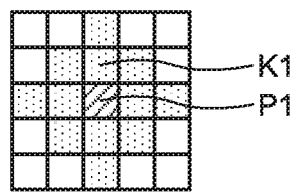
FIG. 8C is a diagram schematically illustrating a selection region (selection region 3) set by a defective pixel correction unit according to the first embodiment of the disclosure.
Figure 8D:
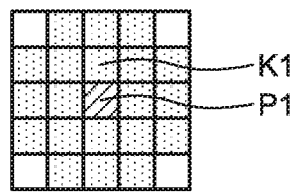
FIG. 8D is a diagram schematically illustrating a selection region (selection region 4) set by a defective pixel correction unit according to the first embodiment of the disclosure.
Figure 8E:
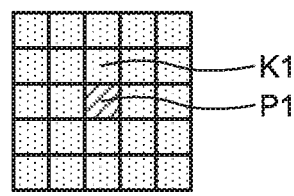
FIG. 8E is a diagram schematically illustrating a selection region (selection region 5) set by a defective pixel correction unit according to the first embodiment of the disclosure.

At Step S14, the defective pixel correction unit 50 sets a minimum region as a selection region. Specifically, as illustrated in FIG. 8A, the defective pixel correction unit 50 sets a selection region including the minimum number of neighboring pixels K1 adjacent to a pixel of interest P1. In FIG. 8A to FIG. 8E, white pixels indicate pixels that are not selected.

Subsequently, the defective pixel correction unit 50 acquires pixel values in the selection region (Step S15). In this case, the defective pixel correction unit 50 acquires pixel values of all of the pixels included in the selection region centered at the pixel of interest, and stores the acquired pixel values of all of the pixels included in the selection region in the storage unit 35.

Thereafter, the defective pixel correction unit 50 deletes a pixel value of a defective pixel stored in the storage unit 35, based on the defective pixel information input from the third external I/F unit 31 (Step S16). Specifically, the defective pixel correction unit 50 determines whether a corresponding pixel is a defective pixel based on the defective pixel information input from the third external I/F unit 31, and when the pixel is a defective pixel, deletes a pixel value corresponding to this pixel from the storage unit 35.

Subsequently, the defective pixel correction unit 50 deletes a pixel value of an RTS noise occurrence pixel stored in the storage unit 35, based on the RTS noise information input from the third external I/F unit 31 (Step S17). Specifically, the defective pixel correction unit 50 determines whether a pixel is the RTS noise occurrence pixel at which RTS noise is likely to occur under a predetermined condition among the pixel values stored in the storage unit 35, based on the RTS noise information input from the third external I/F unit 31, and when the pixel is the RTS noise occurrence pixel, deletes a pixel value corresponding to this pixel from the storage unit 35. Here, the predetermined condition is any of the following conditions (A) to (C).

(A) When positional information on a determination target pixel is included in the RTS noise information.
(B) When the positional information on the determination target pixel is included in the RTS noise information and a difference from a neighboring pixel value is equal to or larger than a predetermined threshold.
(C) When the positional information on the determination target pixel is included in the RTS noise information and a difference from a neighboring pixel value is equal to or larger than RTS_Value×coefficient (for example, a number larger than 0 and equal to or smaller than 1).

Thereafter, the defective pixel correction unit 50 determines whether the number of pixel values stored in the storage unit 35 is equal to or larger than a threshold (for example, equal to or larger than 2) (Step S18). When the number of pixel values stored in the storage unit 35 is equal to or larger than the threshold (Step S18: Yes), the defective pixel correction unit 50 proceeds to Step S21 to be described below. When the number of pixel values stored in the storage unit 35 is not equal to or larger than the threshold (Step S18: No), the defective pixel correction unit 50 proceeds to Step S19 to be described below.

At Step S19, the defective pixel correction unit 50 determines whether the selection region is maximum. When the selection region is maximum (Step S19: Yes), the defective pixel correction unit 50 proceeds to Step S21 to be described below. When the selection region is not maximum (Step S19: No), the defective pixel correction unit 50 proceeds to Step S20 to be described below.

At Step S20, the defective pixel correction unit 50 enlarges the selection region. Specifically, as illustrated in FIG. 8A to FIG. 8E, the defective pixel correction unit 50 sequentially enlarges the selection region until the number of the pixel values stored in the storage unit 35 becomes equal to or larger than the threshold at Step S18 described above (FIG. 8A→FIG. 8B→FIG. 8C→FIG. 8D→FIG. 8E). In this case, when the selection region becomes maximum at Step S19 described above (see FIG. 8E), the defective pixel correction unit 50 proceeds to Step S21 to be described below. In FIG. 8A to FIG. 8E, a shape, a range, and a size of the selection region may be changed in various ways other than the region as described above; for example, a rectangular region may be set. Furthermore, in FIG. 8A to FIG. 8E, it is not necessary to set a plurality of selection regions, and it is sufficient to set at least one selection region. Moreover, in FIG. 8A to FIG. 8E, it is assumed that the selection region is set when a color filter is not provided on a light receiving surface of the image sensor 105. However, when a color filter is provided on the light receiving surface of the image sensor 105 for example, it is sufficient to select a selection region such that only pixels of the same color (pixels at which the same color filters are provided) are used (it is sufficient to use only pixels corresponding to pixels of the same color among the pixels K1 illustrated in FIG. 8A to FIG. 8E).

At Step S21, the defective pixel correction unit 50 determines whether the number of pixel values stored in the storage unit 35 is equal to or larger than 1. When the number of pixel values stored in the storage unit 35 is equal to or larger than 1 (Step S21: Yes), the defective pixel correction unit 50 proceeds to Step S22 to be described below. When the number of pixel values stored in the storage unit 35 is not equal to or larger than 1 (Step S21: No), the defective pixel correction unit 50 proceeds to Step S24 to be described below.

At Step S22, the defective pixel correction unit 50 calculates a correction value of the pixel of interest ((x, y) pixel) of the RAW image by using any of an average value, a mode value, and a median value of the pixel values stored in the storage unit 35. The defective pixel correction unit 50 may determine an edge direction based on the pixel values stored in the storage unit 35, and increase a weight for a pixel value located in the determined direction in order to preferentially reflect the pixel value in the determined direction in the correction value, for example.

Subsequently, the defective pixel correction unit 50 replaces the pixel value of the pixel of interest ((x, y) pixel) of the RAW image with the correction value calculated at Step S22 to correct the pixel value of the pixel of interest of the RAW image (Step S23).

Thereafter, the defective pixel correction unit 50 increments the counter x indicating the position of the RAW image in the horizontal direction (x=x+1) (Step S24), and determines whether the counter x is smaller than an image width of the RAW image (Step S25). When the counter x is smaller than the image width of the RAW image (Step S25: Yes), the defective pixel correction unit 50 returns to Step S13 described above. When the counter x is not smaller than the image width of the RAW image (Step S25: No), the defective pixel correction unit 50 proceeds to Step S26.

Subsequently, the defective pixel correction unit 50 increments the counter y indicating the position of the RAW image in the vertical direction (y=y+1) (Step S26), and determines whether the counter y is smaller than an image height of the RAW image (Step S27). When the counter y is smaller than the image height of the RAW image (Step S27: Yes), the defective pixel correction unit 50 returns to Step S12 described above. When the counter y is not smaller than the image height of the RAW image (Step S27: No), the defective pixel correction unit 50 ends the processing and returns to the main routine in FIG. 6.

Outline of RTS Noise Correction Processing

Next, details of the RTS noise correction processing described at Step S2 in FIG. 6 will be explained. FIG. 9 is a flowchart illustrating an outline of the RTS noise correction processing, and is a flowchart of a sub routine performed by the image processing apparatus 30.

As illustrated in FIG. 9, the RTS noise correction unit 51 resets the counter y indicating the position of the RAW image in the vertical direction (y=0) (Step S31), and resets the counter x indicating the position of the RAW image in the horizontal direction (x=0) (Step S32).

Subsequently, the RTS noise pixel determination unit 321 determines whether RTS noise is likely to occur at the pixel of interest ((x, y) pixel) based on the RTS noise information input from the third external I/F unit 31 (Step S33). That is, the RTS noise pixel determination unit 321 determines whether the positional information on the sharing pixel block including the pixel of interest is included in the RTS noise information. Specifically, the RTS noise pixel determination unit 321 determines whether the positional information on the sharing pixel block including the pixel of interest is included in the RTS noise information as a sharing pixel block in which RTS noise is likely to occur. When the RTS noise information includes positional information on a pixel instead of the positional information on the sharing pixel block, the RTS noise pixel determination unit 321 determines whether the positional information on the pixel of interest is included in the RTS noise information. When the RTS noise pixel determination unit 321 determines that RTS noise is likely to occur at the pixel of interest (determines that the positional information on the sharing pixel block including the pixel of interest is included in the RTS noise information) (Step S33: Yes), the RTS noise correction unit 51 proceeds to Step S34 to be described below. In contrast, when the RTS noise pixel determination unit 321 determines that RTS noise is not likely to occur at the pixel of interest (determines that the positional information on the sharing pixel block including the pixel of interest is not included in the RTS noise information) (Step S33: No), the RTS noise correction unit 51 proceeds to Step S37 to be described below.

At Step S34, the candidate value calculation unit 322 calculates a plurality of candidate values for a correction amount for correcting the RTS noise. Specifically, the candidate value calculation unit 322 sets, as the candidate values, all of values that can be taken as pixel values equal to or larger than zero and equal to or smaller than RTS_Value (all integers equal to or larger than zero and equal to or smaller than RTS_Value when only integers are taken as a RAW image), based on RTS_Value (included in the RTS noise information output from the RTS noise pixel determination unit 321) corresponding to the pixel of interest. When an amplifier gain value that is set in the column amplifier or the like of the image sensor 105 by the imaging controller 114 is different between when the RTS noise is detected (the amplifier gain value=G0) and when the RTS noise is corrected (the amplifier gain value=G1), the candidate value calculation unit 322 may replace RTS_Value with a value obtained by multiplying a ratio of the amplifier gain value obtained when the RTS noise is corrected and the amplifier gain value obtained when the RTS noise is detected (G=G1/G0) by RTS_Value. Furthermore, the candidate value calculation unit 322 may include RTS_Value for each of settable amplifier gain values into the RTS noise information in advance, and use RTS_Value in accordance with the set amplifier gain value.

Subsequently, the representative value calculation unit 323 performs representative value calculation processing for calculating a representative value (an expected pixel value in a case where the RTS noise does not occur at the pixel of interest) based on pixel values of neighboring pixels of the pixel of interest (Step S35). The representative value calculation unit 323 may include a pixel at which the RTS noise occurs.

Outline of Representative Value Calculation Processing

Figure 10:
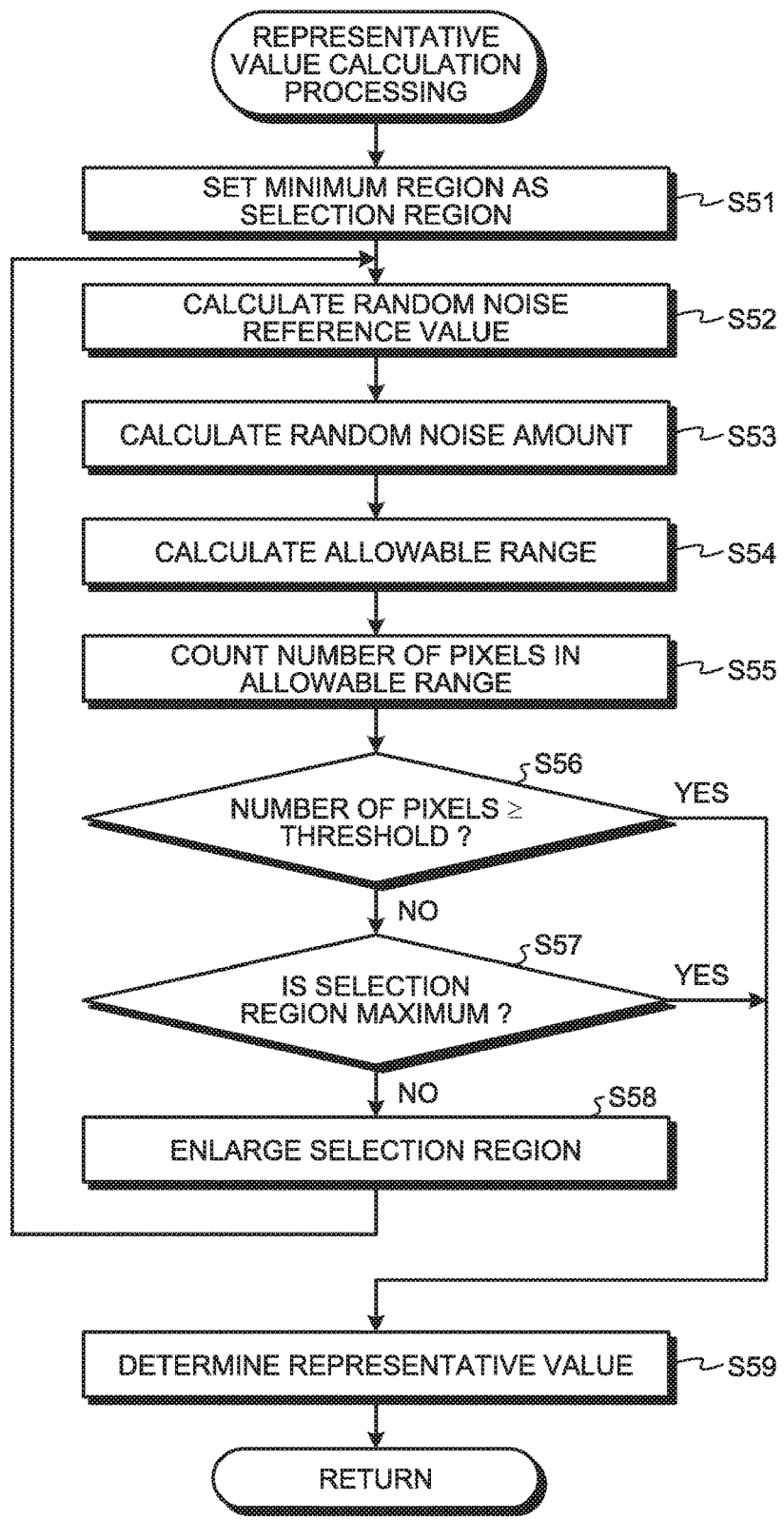
FIG. 10 is a flowchart illustrating an outline of representative value calculation processing in FIG. 9.

FIG. 10 is a flowchart illustrating an outline of the representative value calculation processing at Step S35 in FIG. 9 described above.

As illustrated in FIG. 10, the representative value calculation unit 323 first sets a minimum region as the selection region (Step S51). Specifically, as illustrated in FIG. 8A described above, the defective pixel correction unit 50 sets a selection region including the minimum number of pixels. The representative value calculation unit 323 does not necessarily have to select the same selection region as the selection region that is set by the defective pixel correction unit 50 in the defective pixel correction processing in FIG. 7 described above, but may set a different selection region. In the first embodiment, for simplicity of explanation, it is assumed that the representative value calculation unit 323 selects the same selection region as the selection region that is set by the defective pixel correction unit 50 in the defective pixel correction processing in FIG. 7 described above.

When a color filter is provided on the light receiving surface of the image sensor 105, it is sufficient to select a selection region such that only pixels of the same color (pixels at which the same color filters are provided) are used (it is sufficient to use only pixels corresponding to pixels of the same color among the pixels K1 illustrated in FIG. 8A to FIG. 8E).

Subsequently, the candidate value calculation unit 322 calculates, as a random noise reference value, a value by adding RTS_Value to the pixel value of the pixel of interest or adding the maximum value of the candidate values for the correction amount to the pixel value of the pixel of interest (Step S52).

Thereafter, the random noise amount estimation unit 324 calculates a random noise amount based on the random noise model input from the third external I/F unit 31 and the reference value calculated by the candidate value calculation unit 322 at Step S52 (Step S53).

Figure 11:
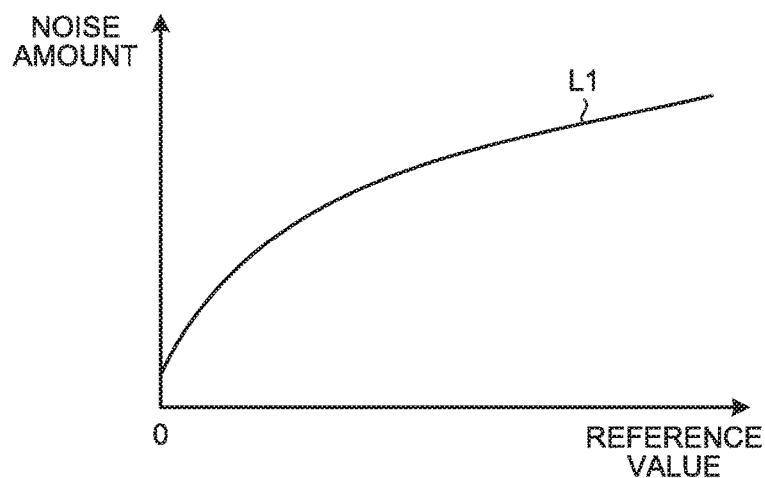
FIG. 11 is a diagram illustrating an example of a random noise model.

FIG. 11 is a diagram illustrating an example of the random noise model. In FIG. 11, a vertical axis represents a noise amount and a horizontal axis represents a reference value. In FIG. 11, a standard deviation of a pixel value is used as the random noise amount on the vertical axis, and a random noise model corresponding to the characteristics of the image sensor 105 is illustrated.

As indicated by a curve L1 in FIG. 11, the random noise amount in the image sensor 105 increases as the pixel value increases. Therefore, the random noise amount estimation unit 324 in the first embodiment calculates the random noise amount (calculates the standard deviation) based on the random noise model of the curve L1 in FIG. 11 and the reference value calculated by the candidate value calculation unit 322. In addition to the curve illustrated in FIG. 11, the random noise model may be approximated by an approximation formula or a polygonal line.

After Step S53, the representative value calculation unit 323 calculates an allowable range (effective range), which is a range of pixel values available for the representative value calculation processing, based on pixel values of pixels in a calculation range (Step S54). Specifically, the representative value calculation unit 323 calculates an upper limit of the allowable range (effective range) by Expression (1) below.

$$\text{Reference value+Random noise amount (standard deviation)} \times R + \text{RTS\_Value} \quad (1)$$

Here, R is a predetermined coefficient and is set depending on how visually the RTS noise can be recognized against random noise. For example, the coefficient of R is preferably set to around 2. Furthermore, the representative value calculation unit 323 calculates a lower limit of the allowable range by Expression (2) below.

$$\text{Reference value-Random noise amount (standard deviation)} \times R - \text{RTS\_Value} \quad (2)$$

It may be possible to use the maximum value of the plurality of candidate values instead of RTS_Value. Furthermore, the reference values in Expressions (1) and (2) may be reference values that are obtained by a reference value method different from the reference value used for estimating the random noise amount by the random noise amount estimation unit 324 at Step S53 described above (for example, the pixel value of the pixel of interest may be set as the reference value). In this manner, the representative value calculation unit 323 can calculate the allowable range by taking into account the RTS noise of the pixel of interest and the random noise around the pixel of interest.

Thereafter, the representative value calculation unit 323 counts the number of pixels which have pixel values within the allowable range and at which RTS noise does not occur among the pixels in the selection region (Step S55).

Subsequently, the representative value calculation unit 323 determines whether the number of the pixels counted at Step S55 is equal to or larger than a threshold (for example, equal to or larger than 2) (Step S56). When the number of the counted pixels is equal to or larger than the threshold (Step S56: Yes), the RTS noise correction unit 51 proceeds to Step S59 to be described below. When the number of the counted pixels is not equal to or larger than the threshold (Step S56: No), the RTS noise correction unit 51 proceeds to Step S57 to be described below.

At Step S57, the representative value calculation unit 323 determines whether the selection region is maximum. When the selection region is maximum (Step S57: Yes), the representative value calculation unit 323 proceeds to Step S59 to be described below. When the selection region is not maximum (Step S57: No), the representative value calculation unit 323 proceeds to Step S58 to be described below.

At Step S58, the representative value calculation unit 323 enlarges the selection region and returns to Step S52 described above. Specifically, as illustrated in FIG. 8A to FIG. 8E described above, the representative value calculation unit 323 sequentially enlarges the selection region until the number of the pixels counted at Step S55 described above becomes equal to or larger than the threshold (FIG. 8A→FIG. 8B→FIG. 8C→FIG. 8D→FIG. 8E). In this case, when the selection region becomes maximum at Step S57 described above (see FIG. 8E), the representative value calculation unit 323 proceeds to Step S59 to be described below.

At Step S59, the representative value calculation unit 323 determines, as the representative value, any of an average value, a mode value, and a median value of pixel values of pixels which are included in the selection region, which have pixel values within the allowable range, and at which RTS noise does not occur. The representative value calculation unit 323 may use an average value of pixel values that are weighted according to distances from the pixel of interest. Furthermore, when the number of the pixels that meet the conditions as described above is zero, the representative value calculation unit 323 determines the value of the pixel of interest as the representative value. Moreover, the representative value calculation unit 323 may determine an edge direction based on pixel values of pixels that meet the conditions as described above, and preferentially determine a pixel value in the determined direction as the representative value by increasing weights of pixel values located in the determined direction, for example. Furthermore, the representative value calculation unit 323 may calculate the representative value by using a RAW image that is just previously captured, or any other image such as a RAW image that is just previously corrected by the RTS noise correction unit 51. After Step S59, the image processing apparatus 30 ends the processing and returns to the sub routine of the RTS noise correction processing in FIG. 9.

Referring back to FIG. 9, the explanation of the processing from Step S36 will be continued.

At Step S36, the correction value calculation unit 325 performs correction value calculation processing for calculating a pixel value of the pixel of interest at which the RTS noise is corrected in the RAW image, based on the plurality of candidate values calculated by the candidate value calculation unit 322 at Step S34 described above, and based on the representative value calculated by the representative value calculation unit 323 at Step S35 described above. After Step S36, the image processing apparatus 30 proceeds to Step S37 to be described later.

Outline of Correction Value Calculation Processing

Figure 12:
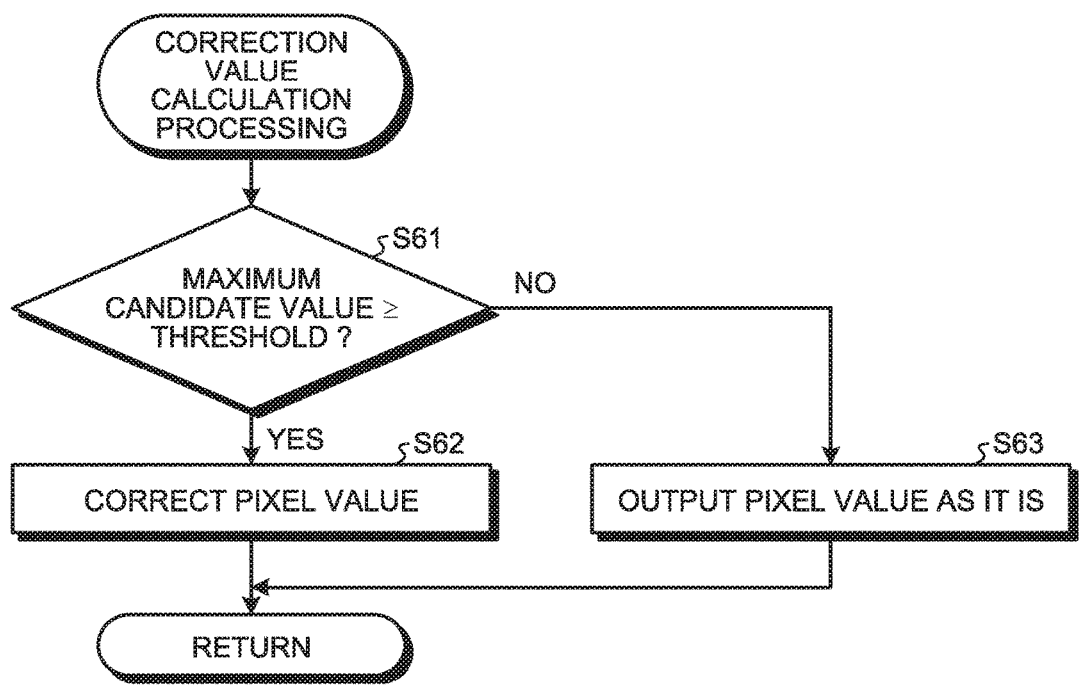
FIG. 12 is a flowchart illustrating an outline of correction value calculation processing in FIG. 9.

FIG. 12 is a flowchart illustrating an outline of the correction value calculation processing at Step S36 in FIG. 9.

As illustrated in FIG. 12, the correction value calculation unit 325 first determines whether the maximum value of the candidate values is equal to or larger than a threshold, based on the random noise amount (the standard deviation in the first embodiment) estimated by the random noise amount estimation unit 324 at Step S53 in FIG. 10 described above, and based on the maximum value of the candidate values calculated by the candidate value calculation unit 322 at Step S34 in FIG. 9 described above (Step S61). Here, the threshold is set by Expression (3) below.

$$\text{Random noise amount} \times Rm \qquad (3)$$

Rm is a predetermined coefficient. It is preferable to set the value of Rm to around 2, which is determined depending on how visually the RTS noise can be recognized against random noise. When the maximum value of the candidate values is equal to or larger than the threshold (Step S61: Yes), the correction value calculation unit 325 proceeds to Step S62 to be described below. In contrast, when the maximum value of the candidate values is not equal to or larger than the threshold (Step S61: No), the correction value calculation unit 325 proceeds to Step S63 to be described below. The correction value calculation unit 325 may use RTS value of the pixel of interest instead of the maximum value of the candidate values, and compare RTS_Value of the pixel of interest with the threshold.

At Step S62, the correction value calculation unit 325 corrects the pixel value. Specifically, the correction value calculation unit 325 first calculates $\Delta$ by Equation (4) below.

$$\Delta = \text{Pixel value of pixel of interest in RAW image} - \text{Representative value} \qquad (4)$$

Subsequently, the correction value calculation unit 325 compares the absolute value of $\Delta$ and one or more of the candidate values calculated by the candidate value calculation unit 322 at Step S34 in FIG. 9 described above, selects a candidate value closest to the absolute value of $\Delta$, and sets the candidate value as $\delta$. When there are a plurality of candidate values closest to the absolute value of $\Delta$, the correction value calculation unit 325 selects the minimum candidate value among the plurality of candidate values as $\delta$ in order to prevent overcorrection.

Finally, the correction value calculation unit 325 corrects the pixel value of the pixel of interest in the RAW image such that the value is shifted in the representative value direction by $\delta$ according to Expressions (5) and (6) below, and outputs the corrected pixel value of the pixel of interest to the image processing unit 33.

$$\text{When } \Delta < 0, \text{ Pixel value of pixel of interest in RAW image} + \delta \qquad (5)$$

$$\text{When } \Delta \geq 0, \text{ Pixel value of pixel of interest in RAW image} - \delta \qquad (6)$$

After Step S62, the image processing apparatus 30 returns to the sub routine of the RTS noise correction processing in FIG. 9. While the correction value calculation unit 325 calculates $\Delta$ and selects the minimum candidate value from among the plurality of candidate values at Step S62, it may be possible to calculate a value by individually adding or subtracting each of the candidate values to or from the pixel value of the pixel of interest in the RAW image, and select a closest representative value among the plurality of values obtained by the addition or the subtraction through the calculation. Furthermore, at Step S62, the correction value calculation unit 325 may use different calculation methods and comparison methods as long as the same result can be obtained. Moreover, processing performed by the correction value calculation unit 325 is equivalent to processing of determining a representative value clipped onto a range equal to or larger than the pixel value of the pixel of interest in the RAW image−RTS_Value and equal to or smaller than the pixel value of the pixel of interest in the RAW image+RTS_Value, as the corrected pixel value of the pixel of interest.

At Step S63, the correction value calculation unit 325 outputs the pixel value of the pixel of interest in the RAW image as it is to the image processing unit 33. After Step S63, the image processing apparatus 30 returns to the sub routine of the RTS noise correction processing in FIG. 9.

Referring back to FIG. 9, the explanation of the processing from Step S37 will be continued.

At Step S37, the RTS noise correction unit 51 increments the counter x indicating the position of the RAW image in the horizontal direction (x=x+1).

Subsequently, the RTS noise correction unit 51 determines whether the counter x is smaller than an image width of the RAW image (Step S38). When the counter x is smaller than the image width of the RAW image (Step S38: Yes), the RTS noise correction unit 51 returns to Step S33 described above. When the counter x is not smaller than the image width of the RAW image (Step S38: No), the image processing apparatus 30 proceeds to Step S39.

Subsequently, the RTS noise correction unit 51 increments the counter y indicating the position of the RAW image in the vertical direction (y=y+1) (Step S39), and determines whether the counter y is smaller than an image height of the RAW image (Step S40). When the counter y is smaller than the image height of the RAW image (Step S40: Yes), the image processing apparatus 30 returns to Step S32 described above. When the counter y is not smaller than the image height of the RAW image (Step S40: No), the image processing apparatus 30 ends the processing and returns to the main routine in FIG. 6.

According to the first embodiment of the disclosure as described above, the defective pixel correction unit 50 corrects defective pixel noise in accordance with the defective pixel information with respect to the RAW image input from the third external I/F unit 31, and the RTS noise correction unit 51 corrects RTS noise in accordance with the RTS noise information with respect to the RAW image in which the pixel value of the defective pixel has been corrected by the defective pixel correction unit 50. Therefore, it is possible to correct image data including the defective pixel noise and the RTS noise with high accuracy.

Furthermore, according to the first embodiment of the disclosure, the defective pixel correction unit 50 corrects the defective pixel noise by using pixel values of pixels excluding a pixel corresponding to the RTS noise information. That is, the defective pixel correction unit 50 corrects the pixel value of the defective pixel without referring to a pixel which is located around the pixel of interest and at which RTS noise is likely to occur, and thereafter, the RTS noise correction unit 51 corrects the RTS noise. Therefore, it is possible to correct image data including the defective pixel noise and the RTS noise with high accuracy.

Modification of First Embodiment

Next, a modification of the first embodiment of the disclosure will be described. The modification of the first embodiment has the same configuration as the first embodiment described above, but is different in that an image processing apparatus performs different defective pixel correction processing. Hereinafter, the defective pixel correction processing performed by the image processing apparatus according to the modification of the first embodiment will be described. The same components as those of the first embodiment described above are denoted by the same reference signs, and explanation thereof will be omitted.

Outline of Defective Pixel Correction Processing

Figure 13:
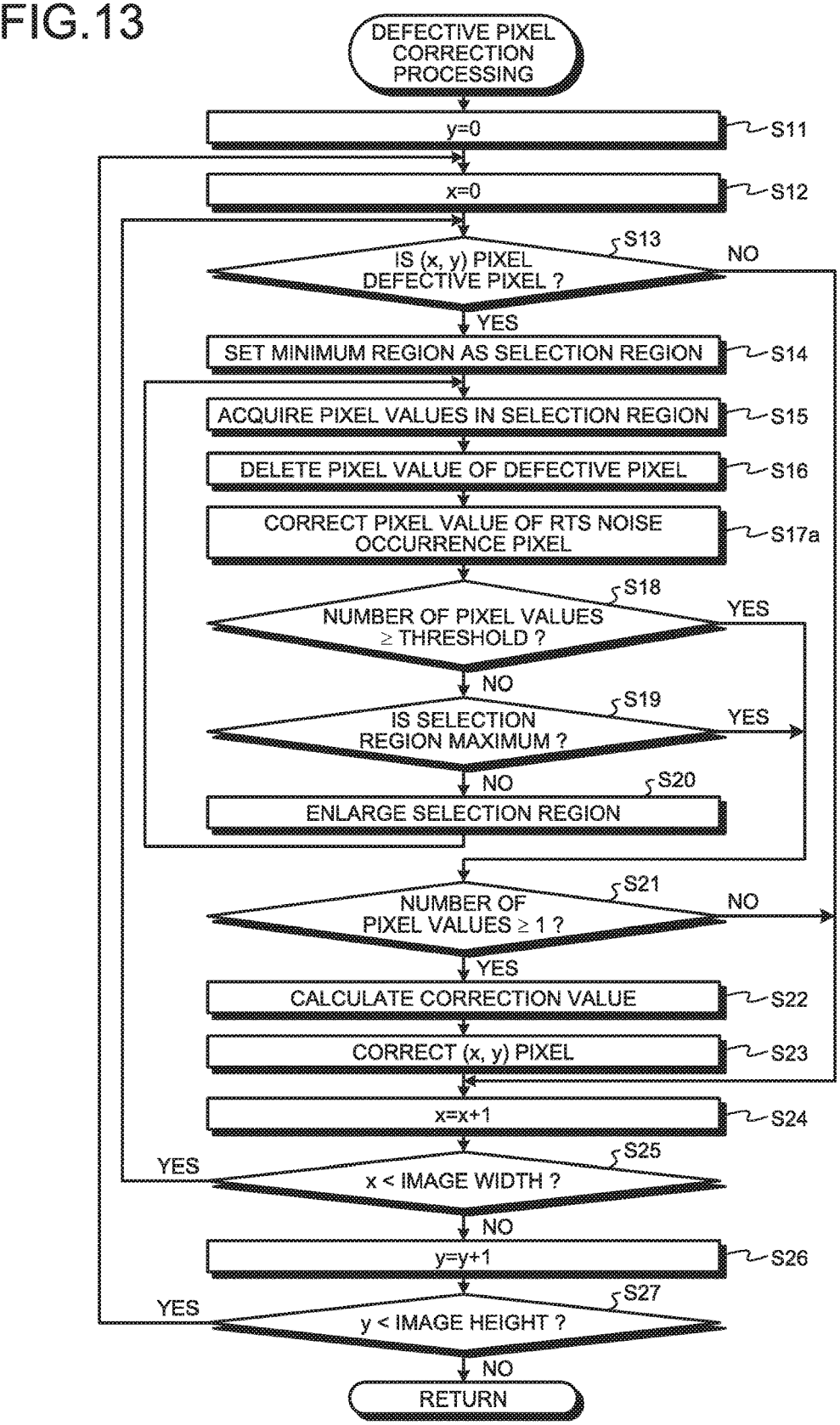
FIG. 13 is a flowchart illustrating an outline of defective pixel correction processing performed by an image processing apparatus according to a modification of the first embodiment of the disclosure.

FIG. 13 is a flowchart illustrating an outline of the defective pixel correction processing performed by the image processing apparatus 30 according to the modification of the first embodiment, and is a flowchart of a sub routine performed by the image processing apparatus 30. In FIG. 13, in the modification of the first embodiment, the defective pixel correction unit 50 performs processing at Step S17a instead of Step S17 in FIG. 7 of the first embodiment described above. Other Steps are the same as those of FIG. 7 described above, and therefore, explanation thereof will be omitted.

As illustrated in FIG. 13, at Step S17a, the defective pixel correction unit 50 corrects a pixel value of an RTS noise occurrence pixel. Specifically, when the pixel values acquired at Step S15 include an RTS noise occurrence pixel based on the RTS noise information input from the third external I/F unit 31, the defective pixel correction unit 50 corrects RTS noise for this pixel value (corrects the acquired pixel value without correcting original image data itself). As a correction method performed by the defective pixel correction unit 50, the same processing as the processing performed by the RTS noise correction unit 51 in the first embodiment described above or simplified processing may be used. As the simplified processing, the defective pixel correction unit 50 calculates an average value of pixel values of neighboring pixels of the RTS noise occurrence pixel, and acquires a value closest to the average value from among the acquired pixel value, a value obtained by adding RTS_Value to the acquired pixel value (pixel value+RTS_Value), and a value obtained by subtracting RTS_Value from the acquired pixel value (pixel value−RTS_Value) (see PCT international application Ser. No. PCT/JP2015/057958 for more details).

According to the modification of the first embodiment of the disclosure as described above, the defective pixel correction unit 50 simply corrects an RTS noise pixel around the pixel of interest based on the RTS noise information, and then use the corrected pixel. Therefore, when there are a number of RTS noise pixels around the defective pixel, it is possible to prevent reduction in the accuracy of a defective pixel correction result due to the influence of random noise or the like.

Second Embodiment

Next, a second embodiment of the disclosure will be described. In an imaging system according to the second embodiment, a noise reduction unit is configured differently from the noise reduction unit 32 of the image processing apparatus 30 of the first embodiment described above, and an image processing apparatus according to the second embodiment performs different processing. Specifically, the noise reduction unit according to the second embodiment corrects RTS noise in a RAW image and thereafter corrects a defective pixel. Hereinafter, a configuration of the noise reduction unit according to the second embodiment will be first described, and then processing performed by the noise reduction unit according to the second embodiment will be described. The same components as those of the imaging system 1 of the first embodiment described above are denoted by the same reference signs, and explanation thereof will be omitted.

Figure 14:
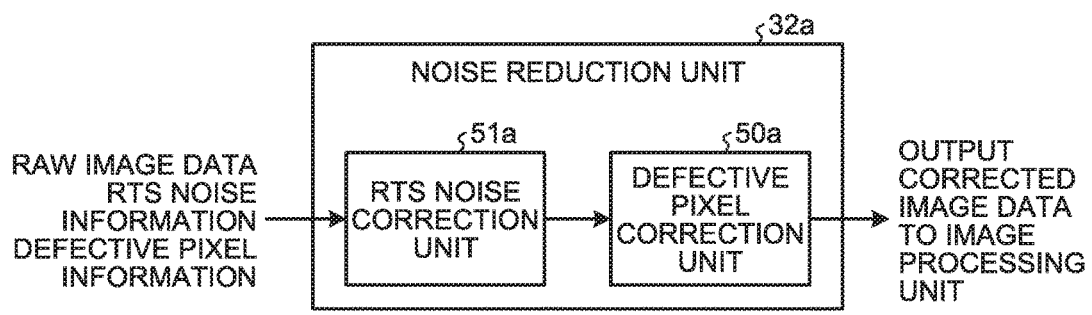
FIG. 14 is a block diagram schematically illustrating a configuration of a noise reduction unit in an image processing apparatus according to a second embodiment of the disclosure.

FIG. 14 is a block diagram schematically illustrating a configuration of the noise reduction unit in the image processing apparatus according to the second embodiment of the disclosure.

A noise reduction unit 32*a* illustrated in FIG. 14 corrects RTS noise in a RAW image input from the third external I/F unit 31, subsequently corrects a defective pixel, and then outputs the corrected RAW image to the image processing unit 33. The noise reduction unit 32*a* includes an RTS noise correction unit 51*a* and a defective pixel correction unit 50*a*.

The RTS noise correction unit 51*a* corrects a pixel value of a pixel at which RTS noise is likely to occur based on the RTS noise information input from the third external I/F unit 31 with respect to a RAW image input from the third external I/F unit 31, and outputs the corrected RAW image to the defective pixel correction unit 50*a*. Details of the RTS noise correction unit 51*a* is the same as the RTS noise correction unit 51 of the first embodiment described above (see FIG. 3), and therefore, explanation thereof will be omitted.

The defective pixel correction unit 50*a* corrects a pixel value of a defective pixel based on the defective pixel information input from the third external I/F unit 31 with respect to the RAW image in which the RTS noise has been corrected and which is input from the RTS noise correction unit 51*a*, and outputs the corrected RAW image to the image processing unit 33.

Processing Performed by Image Processing Apparatus

Figure 15:
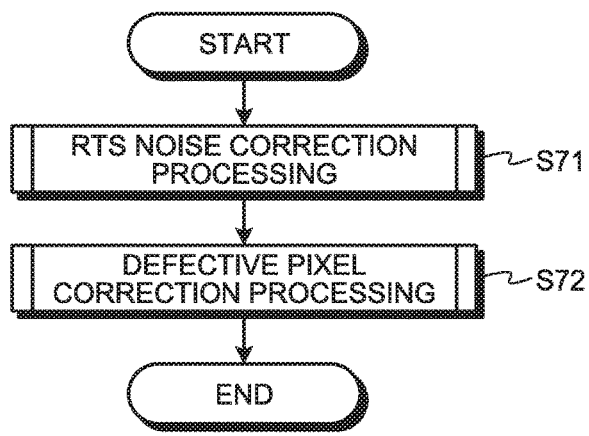
FIG. 15 is a flowchart illustrating an outline of noise correction processing performed by the image processing apparatus according to the second embodiment of the disclosure.

Next, processing performed by the image processing apparatus 30 will be described below. FIG. 15 is a flowchart illustrating an outline of the noise correction processing performed by the image processing apparatus 30, and is a flowchart of a main routine performed by the image processing apparatus 30.

As illustrated in FIG. 15, the RTS noise correction unit 51*a* first performs RTS noise correction processing for correcting RTS noise based on the RTS noise information input from the third external I/F unit 31 with respect to the RAW image input from the third external I/F unit 31, (Step S71). Details of the RTS noise correction processing will be described later.

Subsequently, the defective pixel correction unit 50*a* corrects a defective pixel based on the defective pixel information input from the third external I/F unit 31 with respect to the RAW image in which the RTS noise has been corrected and which is input from the RTS noise correction unit 51*a*, and outputs the corrected RAW image to the image processing unit 33 (Step S72). Details of the defective pixel correction processing will be described later. After Step S72, the image processing apparatus 30 ends the processing.

Outline of RTS Noise Correction Processing

Next, the RTS noise correction processing described at Step S71 in FIG. 15 will be described. The RTS noise correction processing according to the second embodiment is different from the RTS noise correction processing in FIG. 9 described above only in terms of the representative value calculation processing. Hereinafter, the representative value calculation processing performed by the RTS noise correction unit 51*a* according to the second embodiment will be described.

Outline of Representative Value Calculation Processing

Figure 16:
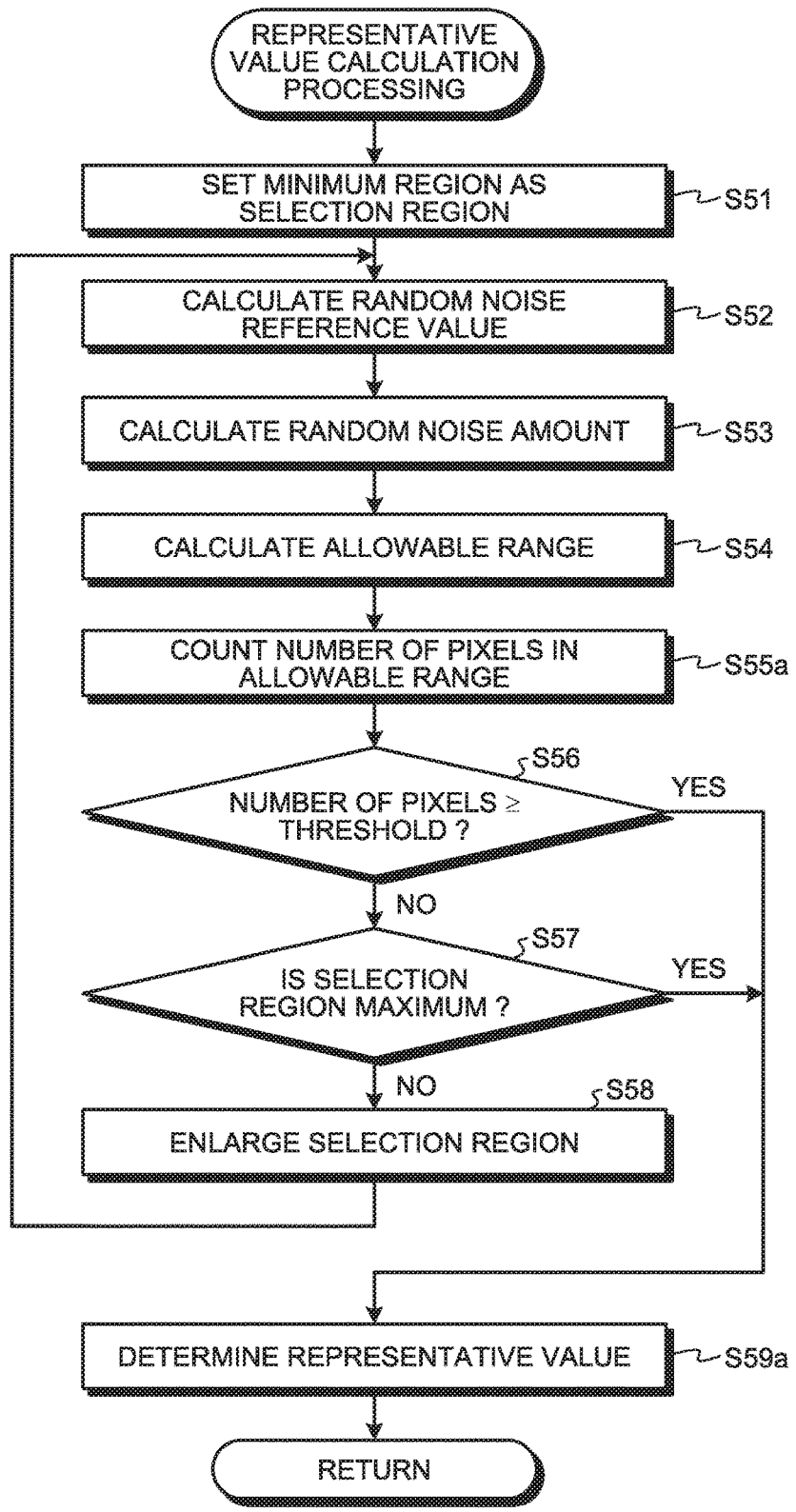
FIG. 16 is a flowchart illustrating an outline of representative value calculation processing performed by the image processing apparatus according to the second embodiment of the disclosure.

FIG. 16 is a flowchart illustrating an outline of the representative value calculation processing performed by the RTS noise correction unit 51*a* according to the second embodiment at Step S35 in FIG. 9 described above. In FIG. 16, the RTS noise correction unit 51*a* of the second embodiment performs processing at Step S55*a* and Step S59*a* instead of the processing at Step S55 and Step S59 in FIG. 10 in the first embodiment described above. Other Steps are the same as those of FIG. 10 described above, and therefore, explanation thereof will be omitted.

At Step S55*a*, the representative value calculation unit 323 counts the number of pixels which have pixel values within the allowable range, at which RTS noise does not occur, and which are not defective pixels among the pixels in the selection region.

At Step S59*a*, the representative value calculation unit 323 determines, as the representative value, any of an average value, a mode value, and a median value of pixels which are included in the selection region, which have pixel values within the allowable range, at which RTS noise does not occur, and which are not defective pixels. The representative value calculation unit 323 may use an average value of pixel values that are weighted according to distances from the pixel of interest. Furthermore, when the number of the pixels that meet the conditions as described above is zero, the representative value calculation unit 323 determines the value of the pixel of interest as the representative value. Moreover, the representative value calculation unit 323 may determine an edge direction based on pixel values of pixels that meet the conditions as described above, and preferentially determine a pixel value in the determined direction as the representative value by increasing weights of pixel values located in the determined direction, for example. Furthermore, the representative value calculation unit 323 may calculate the representative value by using a RAW image that is just previously captured, or any other image such as a RAW image that is just previously corrected by the RTS noise correction unit 51. After Step S59*a*, the RTS noise correction unit 51*a* ends the processing and returns to the sub routine of the RTS noise correction processing in FIG. 9.

Outline of Defective Pixel Correction Processing

Figure 17:
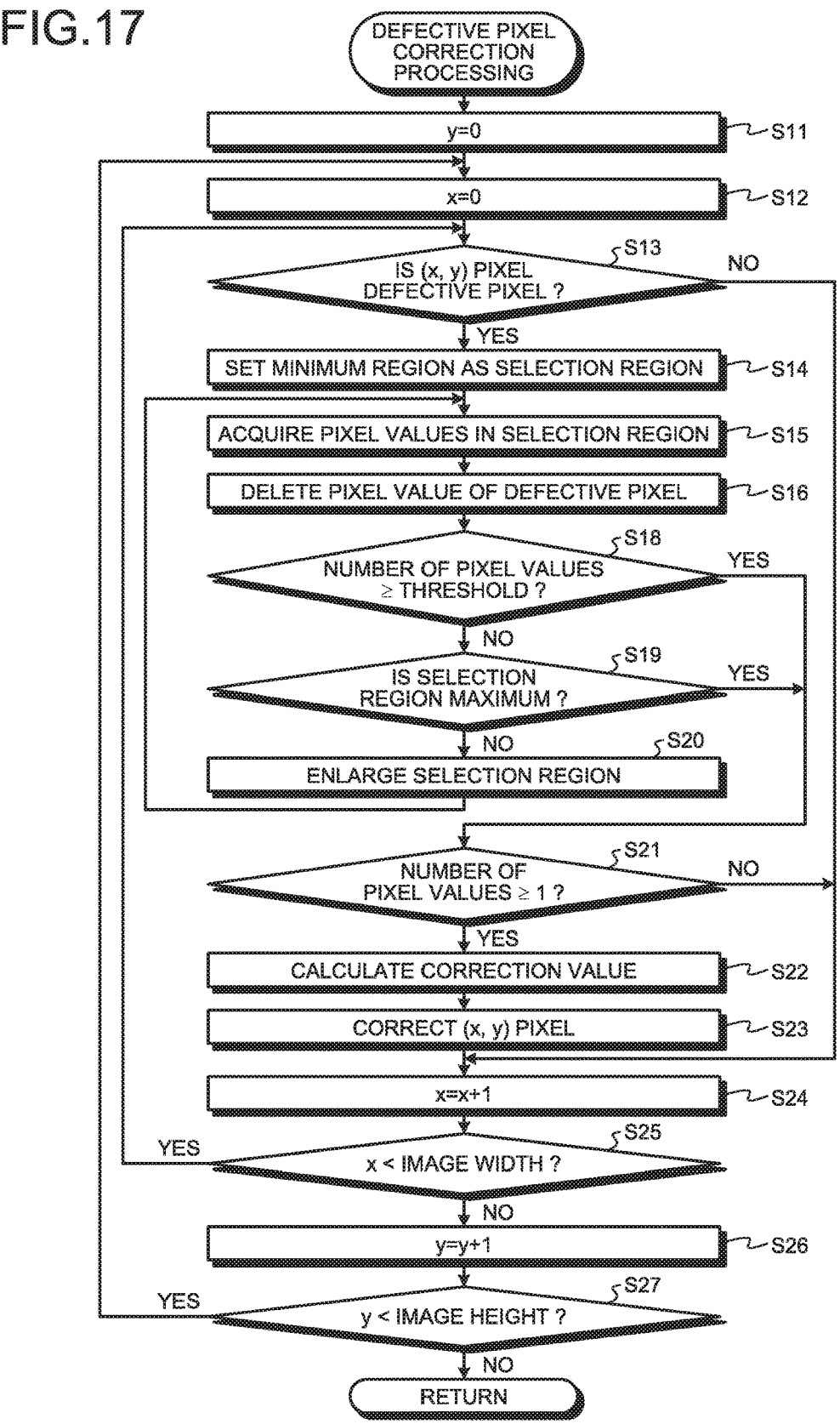
FIG. 17 is a flowchart illustrating an outline of defective pixel correction processing performed by the image processing apparatus according to the second embodiment of the disclosure.

Next, details of the defective pixel correction processing described at Step S72 in FIG. 15 will be described. FIG. 17 is a flowchart illustrating an outline of the defective pixel correction processing, and is a flowchart of a sub routine performed by the defective pixel correction unit 50*a*.

As illustrated in FIG. 17, only the processing at Step S17 in FIG. 7 of the first embodiment described above is omitted. That is, in FIG. 17, the defective pixel correction unit 50*a* performs the processing of FIG. 7 of the first embodiment described above except for the processing at Step S17. After Step S27, the image processing apparatus 30 returns to the main routine in FIG. 15.

According to the second embodiment of the disclosure as described above, the RTS noise correction unit 51*a* corrects RTS noise in accordance with the RTS noise information with respect to the RAW image input from the third external I/F unit 31, and the defective pixel correction unit 50*a* corrects defective pixel noise in accordance with the defective pixel information with respect to the RAW image in which the RTS noise has been corrected by the the RTS noise correction unit 51a. Therefore, it is possible to correct image data including the defective pixel noise and the RTS noise with high accuracy.

Furthermore, according to the second embodiment of the disclosure, the RTS noise correction unit 51a corrects RTS noise by using pixel values of pixels except for a pixel corresponding to the defective pixel information. That is, the RTS noise correction unit 51a corrects the RTS noise by using pixel values of pixels except for a pixel corresponding to the defective pixel information, and thereafter, the defective pixel correction unit 50a corrects the defective pixel noise. Therefore, it is possible to correct image data including the defective pixel noise and the RTS noise with high accuracy.

Moreover, according to the second embodiment of the disclosure, when the RTS noise correction unit 51a corrects the RTS noise, pixel values of neighboring pixels of the pixel of interest are calculated; however, because a defective pixel and an RTS noise pixel are excluded, it is possible to correct image data including the defective pixel noise and the RTS noise with high accuracy.

In the second embodiment of the disclosure, when the pixel of interest is a defective pixel based on the defective pixel information, the RTS noise correction unit 51a deletes a pixel value of the pixel of interest from pixel values of pixels to be referred to. However, for example, when a pixel value of the defective pixel is in a predetermined range and the pixel value is correctable, it may be possible to correct the pixel value of the defective pixel and use the corrected pixel as a pixel to be referred to for correcting the RTS noise.

Third Embodiment

Next, a third embodiment of the disclosure will be described. In an imaging system according to the third embodiment, a noise reduction unit is configured differently from the noise reduction unit 32 of the image processing apparatus 30 of the first embodiment described above, and an image processing apparatus according to the third embodiment performs different processing. Specifically, it is determined whether a pixel of interest is a defective pixel or an RTS noise pixel, and a correction result is selected based on a determination result. Hereinafter, a configuration of the imaging system according to the third embodiment will be first described, and then the processing performed by the image processing apparatus according to the third embodiment will be described. The same components as those of the imaging system 1 of the first embodiment described above are denoted by the same reference signs, and explanation thereof will be omitted.

Figure 18:
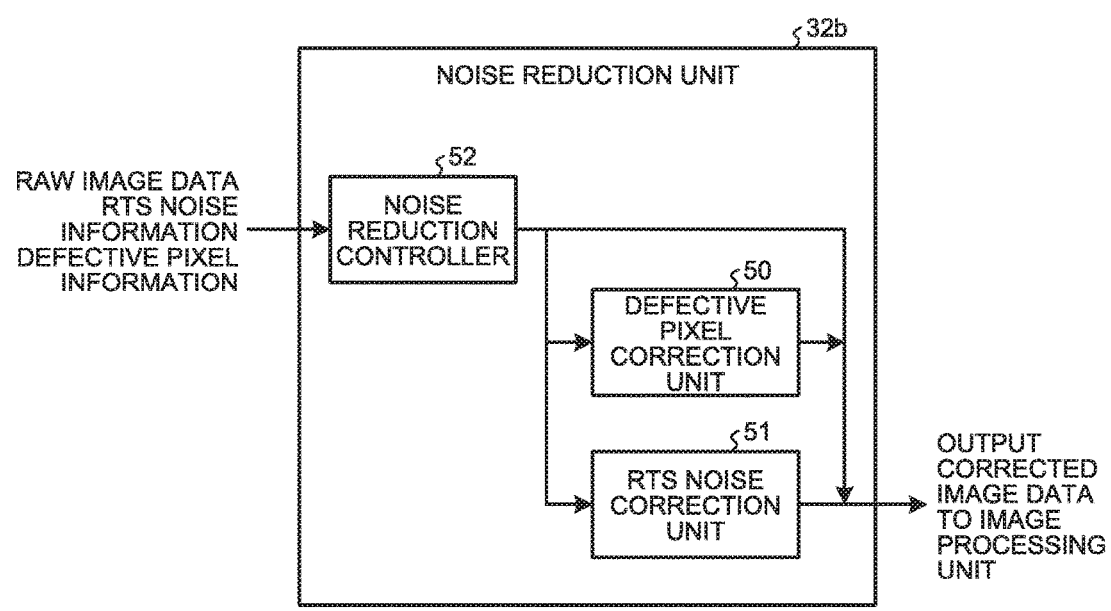
FIG. 18 is a block diagram schematically illustrating a configuration of a noise reduction unit in an image processing apparatus according to a third embodiment of the disclosure.

FIG. 18 is a block diagram schematically illustrating a configuration of the noise reduction unit in the image processing apparatus according to the third embodiment of the disclosure. A noise reduction unit 32b illustrated in FIG. 18 corrects either RTS noise or defective pixel in a RAW image input from the third external I/F unit 31, and outputs the corrected RAW image to the image processing unit 33. Specifically, the noise reduction unit 32b performs either one of RTS noise correction and defective pixel correction based on the RTS noise information and the defective pixel information with respect to the RAW image input from the third external I/F unit 31, and outputs the corrected RAW image to the image processing unit 33. The noise reduction unit 32b includes the defective pixel correction unit 50, the RTS noise correction unit 51, and a noise reduction controller 52.

The noise reduction controller 52 causes either one of the defective pixel correction unit 50 and the RTS noise correction unit 51 to correct a pixel value of a pixel of interest in the RAW image input from the third external I/F unit 31, based on the RTS noise information and the defective pixel information input from the third external I/F unit 31.

Processing Performed by Image Processing Apparatus

Figure 19:
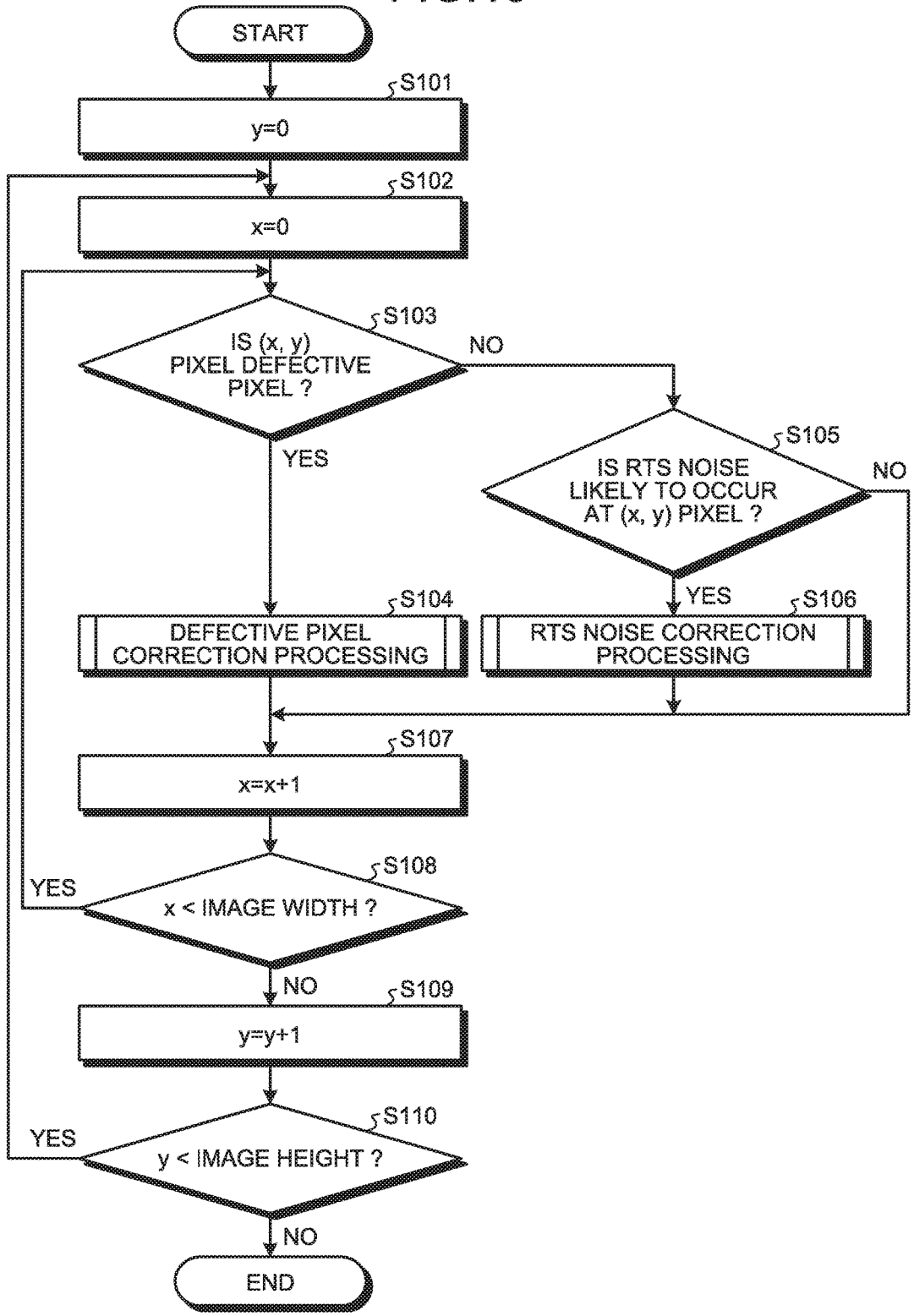
FIG. 19 is a flowchart illustrating an outline of processing performed by the image processing apparatus according to the third embodiment of the disclosure.

Next, processing performed by the image processing apparatus 30 will be described below. FIG. 19 is a flowchart illustrating an outline of processing performed by the image processing apparatus 30.

As illustrated in FIG. 19, the noise reduction controller 52 resets the counter y indicating the position of the RAW image in the vertical direction (y=0) (Step S101), and resets the counter x indicating the position of the RAW image in the horizontal direction (x=0) (Step S102).

Subsequently, the noise reduction controller 52 determines whether a pixel of interest ((x, y) pixel) in the RAW image is a defective pixel based on the defective pixel information input from the third external I/F unit 31 (Step S103). When the pixel of interest in the RAW image is a defective pixel (Step S103: Yes), the noise reduction controller 52 causes the defective pixel correction unit 50 to perform defective pixel correction processing (Step S104).

Outline of Defective Pixel Correction Processing

Figure 20:
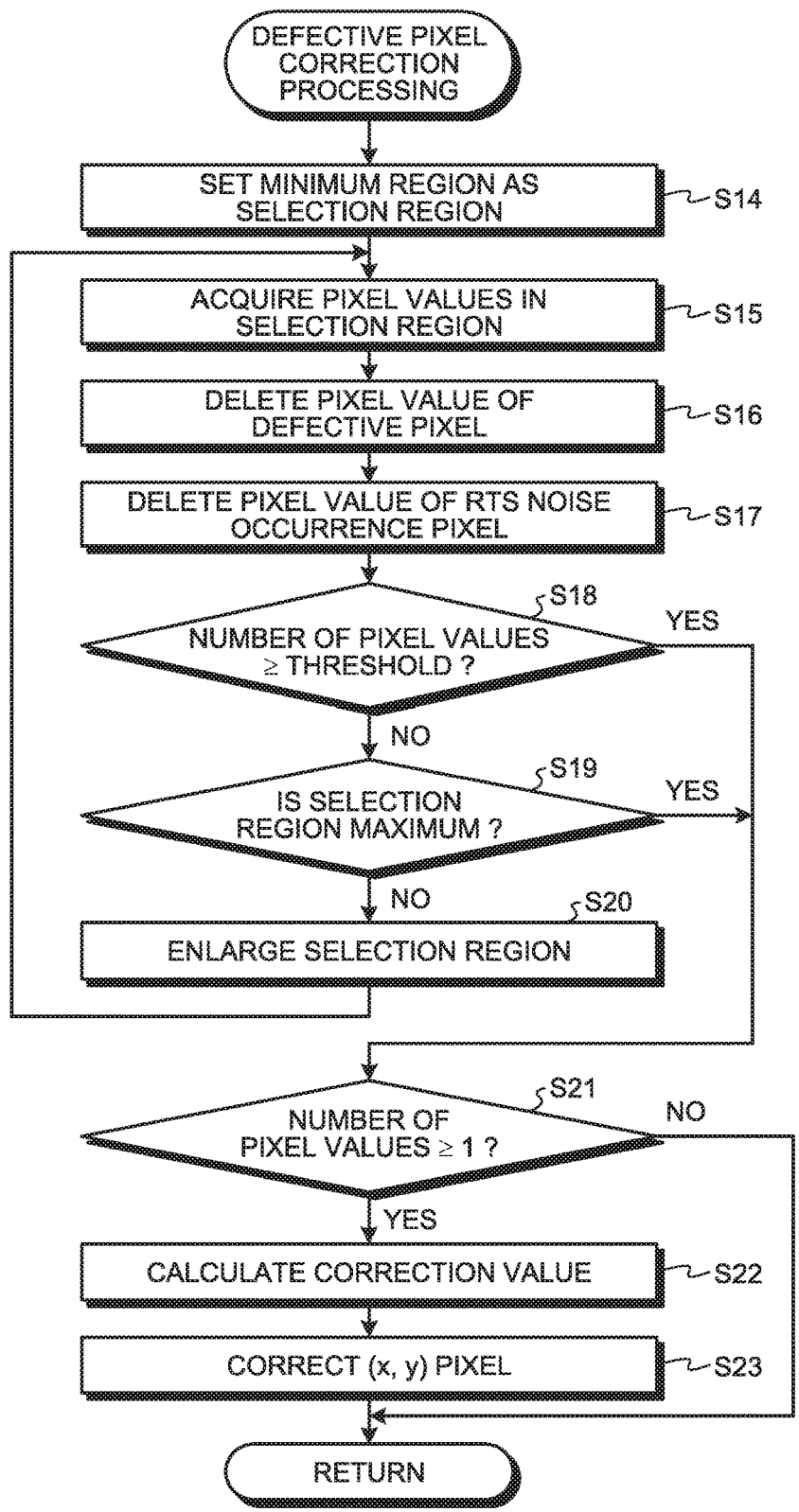
FIG. 20 is a flowchart illustrating an outline of defective pixel correction processing in FIG. 19.

FIG. 20 is a flowchart illustrating an outline of the defective pixel correction processing at Step S104 in FIG. 19. In FIG. 20, only processes at Step S11, Step S12, Step S13, and Step S24 to Step S27 are omitted from the defective pixel correction processing of the first embodiment described above (see FIG. 7); therefore, explanation of the processing will be omitted. After Step S23, the noise reduction unit 32b returns to the main routine in FIG. 19.

Referring back to FIG. 19, the explanation will be continued.

At Step S103, when the pixel of interest in the RAW image is not a defective pixel (Step S103: No), the image processing apparatus 30 proceeds to Step S105 to be described below.

Subsequently, the noise reduction controller 52 determines whether RTS noise is likely to occur at the pixel of interest ((x, y) pixel) in the RAW image based on the RTS noise information input from the third external I/F unit 31 (Step S105). When RTS noise is likely to occur at the pixel of interest (Step S105: Yes), the noise reduction controller 52 causes the RTS noise correction unit 51 to perform RTS noise correction processing (Step S106).

Outline of RTS Noise Correction Processing

Figure 21:
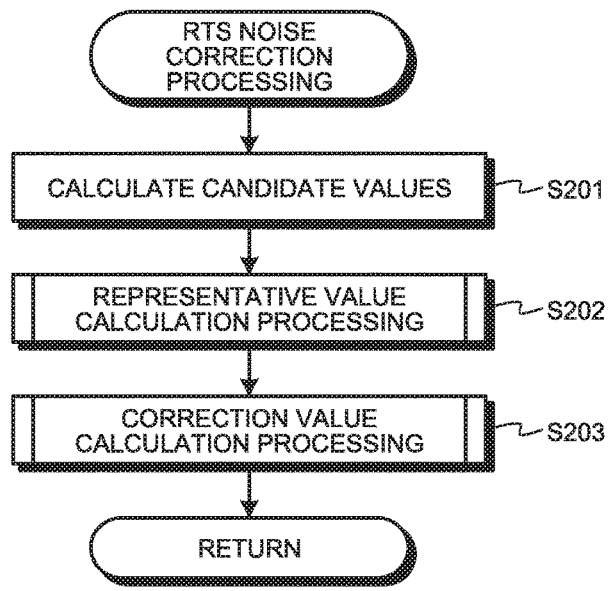
FIG. 21 is a flowchart illustrating an outline of RTS noise correction processing in FIG. 19.

FIG. 21 is a flowchart illustrating an outline of the RTS noise correction processing at Step S106 in FIG. 19. In FIG. 21, Step S201 corresponds to Step S34 in FIG. 9 of the first embodiment described above. Furthermore, the representative value calculation processing at Step S202 corresponds to the representative value calculation processing in FIG. 16 of the second embodiment described above. Moreover, the correction value calculation processing at Step S203 corresponds to the correction value calculation processing in FIG. 12 of the first embodiment described above. After Step S203, the RTS noise correction unit 51 returns to the main routine in FIG. 19.

Referring back to FIG. 19, the explanation will be continued.

At Step S105, when the RTS noise is not likely to occur at the pixel of interest in the RAW image (Step S105: No), the image processing apparatus 30 proceeds to Step S107.

The noise reduction controller 52 increments the counter x indicating the position of the RAW image in the horizontal direction (x=x+1) (Step S107).

Subsequently, the noise reduction controller 52 determines whether the counter x is smaller than an image width of the RAW image (Step S108). When the counter x is smaller than the image width of the RAW image (Step S108: Yes), the noise reduction controller 52 returns to Step S103 described above. When the counter x is not smaller than the image width of the RAW image (Step S108: No), the noise reduction controller 52 proceeds to Step S109.

Subsequently, the noise reduction controller 52 increments the counter y indicating the position of the RAW image in the vertical direction (y=y+1) (Step S109), and determines whether the counter y is smaller than an image height of the RAW image (Step S110). When the counter y is smaller than the image height of the RAW image (Step S110: Yes), the noise reduction controller 52 returns to Step S102 described above. When the counter y is not smaller than the image height of the RAW image (Step S110: No), the noise reduction controller 52 ends the processing.

According to the third embodiment of the disclosure as described above, when determining that the pixel of interest is a defective pixel based on the RTS noise information and the defective pixel information, the noise reduction controller 52 causes the defective pixel correction unit 50 to correct the pixel value of the pixel of interest, and when determining that the pixel of interest is an RTS noise pixel, causes the RTS noise correction unit 51 to correct the pixel value of the pixel of interest. Therefore, it is possible to achieve the same effects as those of the first and the second embodiments as described above, and perform the defective pixel correction and the RTS noise correction in parallel. Consequently, it is possible to reduce a processing delay time.

Fourth Embodiment

Next, a fourth embodiment of the disclosure will be described. In the fourth embodiment, a noise reduction unit is configured differently and the noise reduction unit performs different processing. Specifically, each of the defective pixel correction unit and the RTS noise correction unit performs correction and each of the correction results is selected and output to the image processing unit. Therefore, hereinafter, a configuration of the noise reduction unit of the fourth embodiment will be first described, and then the processing performed by the noise reduction unit will be described. The same components as those of the imaging system 1 of the first embodiment described above are denoted by the same reference signs, and explanation thereof will be omitted.

Figure 22:
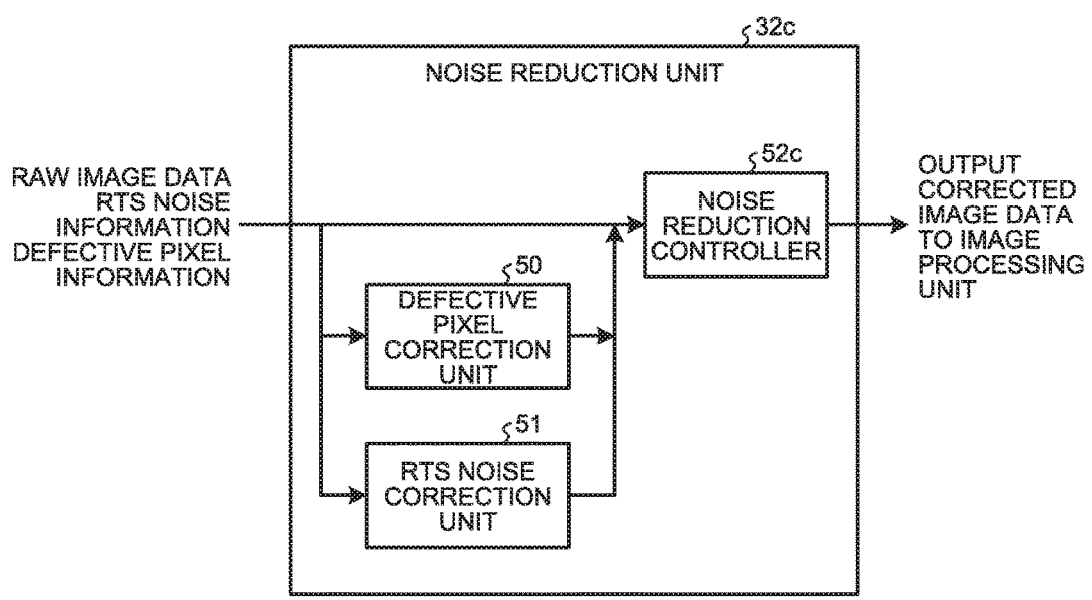
FIG. 22 is a block diagram schematically illustrating a configuration of a noise reduction unit in an image processing apparatus according to a fourth embodiment of the disclosure.

FIG. 22 is a block diagram schematically illustrating a configuration of the noise reduction unit of an image processing apparatus according to the fourth embodiment of the disclosure. A noise reduction unit 32c illustrated in FIG. 22 includes the defective pixel correction unit 50, the RTS noise correction unit 51, and a noise reduction controller 52c. The defective pixel correction unit 50 and the RTS noise correction unit 51 are provided in parallel.

The noise reduction controller 52c selects either one of the pixel value of the pixel of interest corrected by the defective pixel correction unit 50 and the pixel value of the pixel of interest corrected by the RTS noise correction unit 51 with respect to the pixel value of the pixel of interest in the RAW image input from the third external I/F unit 31, based on the RTS noise information and the defective pixel information input from the third external I/F unit 31, and outputs the corrected image to the image processing unit 33.

Processing Performed by Image Processing Apparatus

Figure 23:
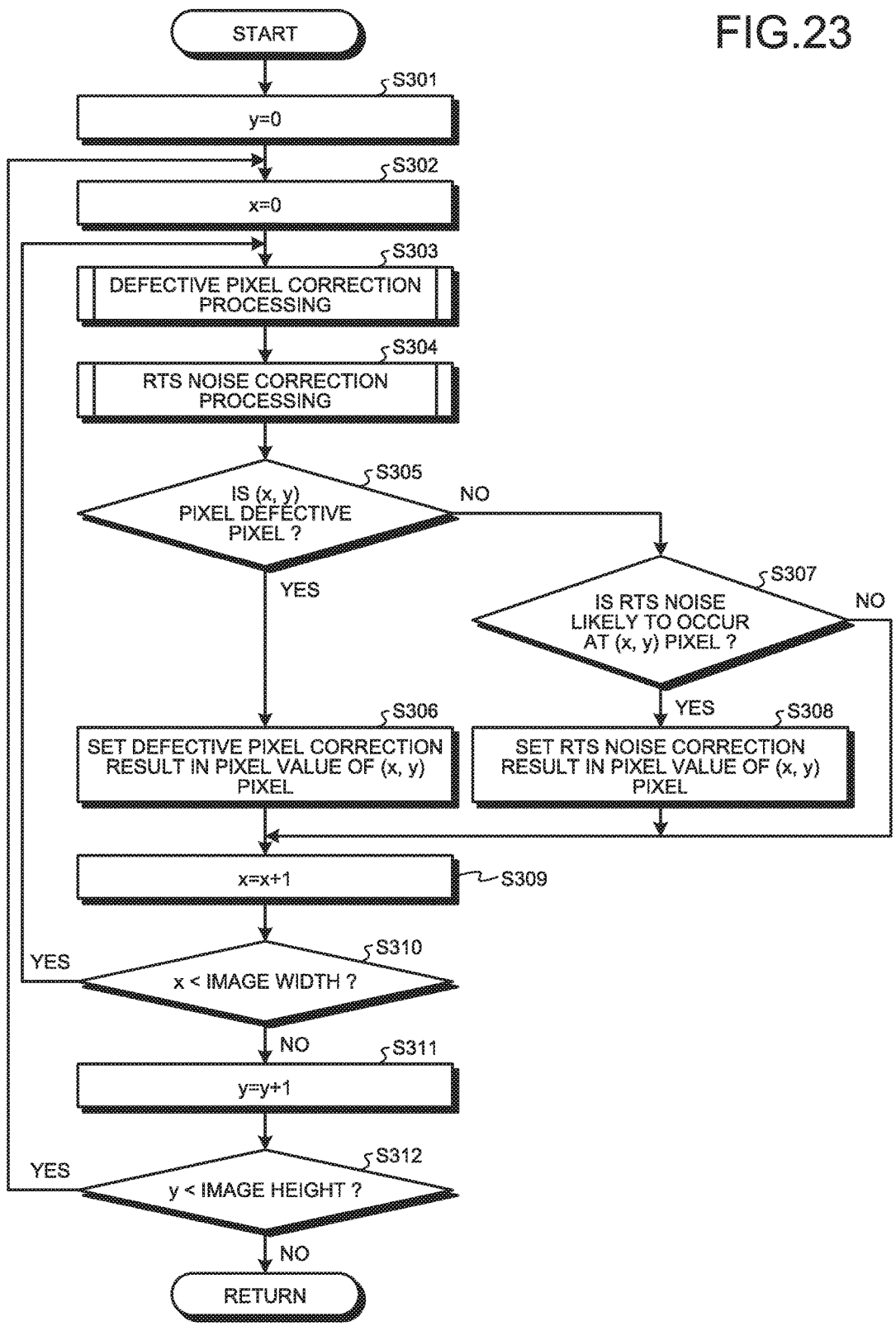
FIG. 23 is a flowchart illustrating an outline of noise correction processing performed by the image processing apparatus according to the fourth embodiment of the disclosure.

Next, processing performed by the image processing apparatus 30 will be described below. FIG. 23 is a flowchart illustrating an outline of the noise reduction processing performed by the image processing apparatus 30.

In FIG. 23, Step S301 and Step S302 respectively correspond to Step S101 and Step S102 in FIG. 19 described above.

At Step S303, the defective pixel correction unit 50 performs the defective pixel correction processing for correcting the defective pixel, and outputs a defective pixel correction result to the noise reduction controller 52c (Step S303). Details of the defective pixel correction processing is the same as the defective pixel correction processing of the third embodiment described above (see FIG. 20), and therefore, explanation thereof will be omitted.

Subsequently, the RTS noise correction unit 51 performs the RTS noise correction processing for correcting the RTS noise, and outputs an RTS noise correction result to the noise reduction controller 52c (Step S304). Details of the RTS noise correction processing is the same as the RTS noise correction processing of the third embodiment described above (see FIG. 21), and therefore, explanation thereof will be omitted.

Thereafter, the noise reduction controller 52c determines whether the pixel of interest ((x, y) pixel) in the RAW image is a defective pixel based on the defective pixel information input from the third external I/F unit 31 (Step S305). When the noise reduction controller 52c determines that the pixel of interest in the RAW image is a defective pixel (Step S305: Yes), the noise reduction unit 32c proceeds to Step S306 to be described below. In contrast, when the noise reduction controller 52c determines that the pixel of interest in the RAW image is not a defective pixel (Step S305: No), the noise reduction unit 32c proceeds to Step S307 to be described below.

At Step S306, the noise reduction controller 52c sets the defective pixel correction result input from the defective pixel correction unit 50 in the pixel value of the pixel of interest ((x, y) pixel), and outputs the corrected image to the image processing unit 33. After Step S306, the noise reduction unit 32c proceeds to Step S309 to be described below.

At Step S307, the noise reduction controller 52c determines whether RTS noise is likely to occur at the pixel of interest ((x, y) pixel) in the RAW image based on the RTS noise information input from the third external I/F unit 31 (Step S307). When the noise reduction controller 52c determines that RTS noise is likely to occur at the pixel of interest ((x, y) pixel) in the RAW image (Step S307: Yes), the noise reduction unit 32c proceeds to Step S308 to be described below. In contrast, when the noise reduction controller 52c determines that RTS noise is not likely to occur at the pixel of interest ((x, y) pixel) in the RAW image (Step S307: No), the noise reduction unit 32c proceeds to Step S309 to be described below.

At Step S308, the noise reduction controller 52c sets the RTS noise correction result input from the RTS noise correction unit 51 in the pixel value of the pixel of interest ((x, y) pixel), and outputs the corrected image to the image processing unit 33. After Step S308, the noise reduction unit 32c proceeds to Step S309 to be described below.

Step S309 to Step S312 respectively correspond to Step S107 to Step S110 in FIG. 19 described above.

According to the fourth embodiment of the disclosure as described above, it is possible to correct a defective pixel and a blinking defective pixel in image data including the defective pixel and the blinking defective pixel with high accuracy.

Fifth Embodiment

Next, a fifth embodiment of the disclosure will be described. In the first embodiment described above, the image processing apparatus 30 is separately provided. However, in the fifth embodiment, an image processing apparatus is provided in a main body of an imaging apparatus. Therefore, hereinafter, the same components as those of the imaging system 1 of the first embodiment described above are denoted by the same reference signs, and explanation thereof will be omitted.

Configuration of Imaging System

Figure 24:
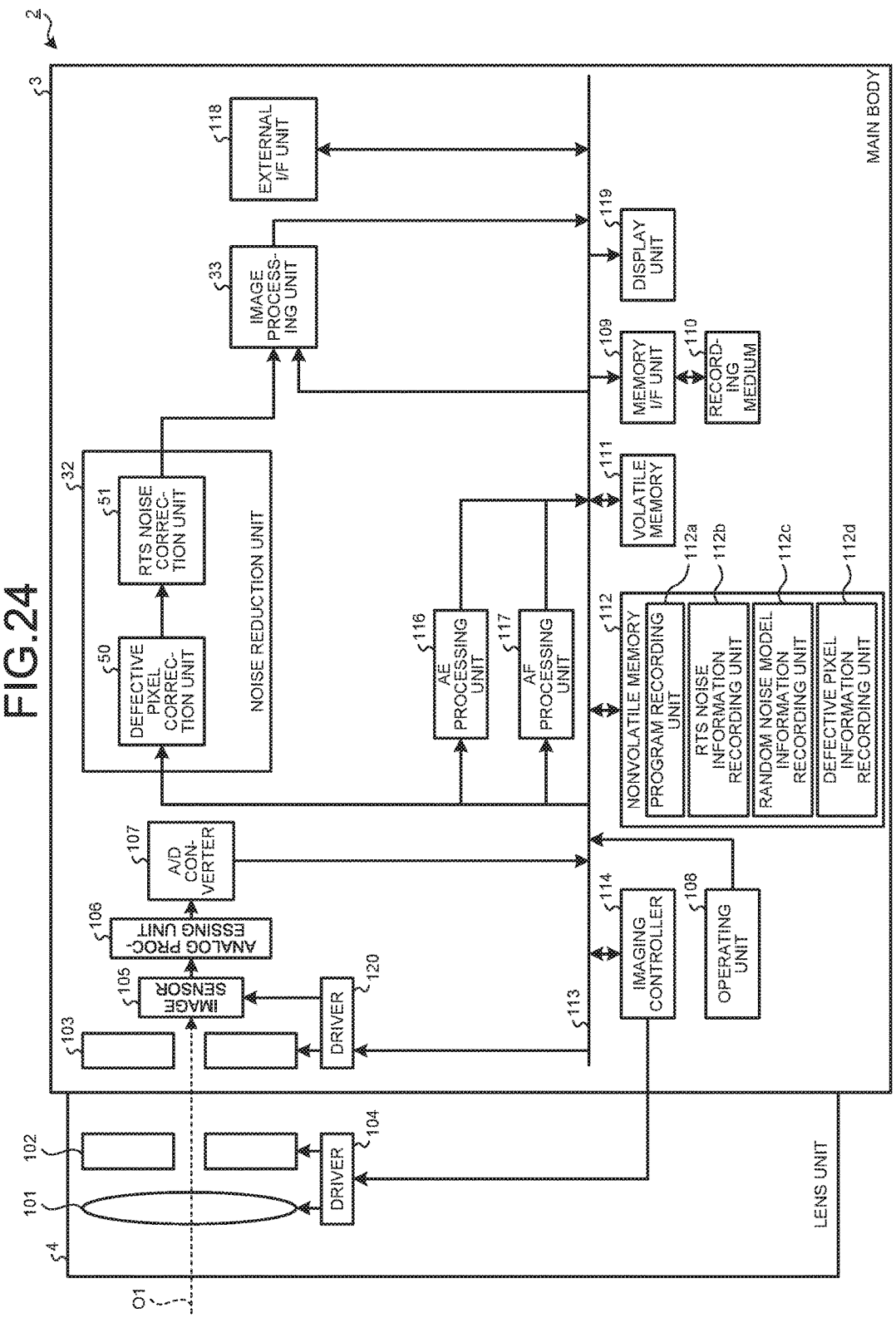
FIG. 24 is a block diagram schematically illustrating a configuration of an imaging system according to a fifth embodiment of the disclosure.

FIG. 24 is a block diagram schematically illustrating a configuration of an imaging system 2 according to the fifth embodiment of the disclosure. The imaging system 2 illustrated in FIG. 24 includes a main body 3 and a lens unit 4 that is removably connectable to the main body 3.

Configuration of Main Body

The main body 3 includes the shutter 103, the image sensor 105, the analog processing unit 106, the A/D converter 107, the operating unit 108, the memory I/F unit 109, the recording medium 110, the volatile memory 111, the nonvolatile memory 112, the bus 113, the imaging controller 114, an AE processing unit 116, an AF processing unit 117, an external I/F unit 118, a display unit 119, a driver 120, the noise reduction unit 32, and the image processing unit 33. The driver 120 drives the shutter 103 under the control of the imaging controller 114.

The AE processing unit 116 acquires image data stored in the volatile memory 111 via the bus 113, and sets an exposure condition used for capturing a still image or capturing a moving image, based on the acquired image data. Specifically, the AE processing unit 116 calculates luminance from the image data, and performs automatic exposure (auto exposure) of the imaging system 2 by determining, for example, a diaphragm value, an exposure time, an ISO sensitivity, or the like based on the calculated luminance.

The AF processing unit 117 acquires image data stored in the volatile memory 111 via the bus 113, and adjusts autofocus of the imaging system 2 based on the acquired image data. For example, the AF processing unit 117 extracts a high frequency component signal from the image data and performs autofocus (AF) calculation processing on the high frequency component signal, to thereby determine focus evaluation of the imaging system 2 and adjust autofocus of the imaging system 2. As a method of adjusting the autofocus of the imaging system 2, it may be possible to acquire a phase difference signal by the image sensor 105.

The external I/F unit 118 can read and write data in various blocks in the main body 3 and perform control using a dedicated command or the like. The external I/F unit 118 is an interface capable of controlling various blocks in the main body 3 by connecting a dedicated circuit on which an FPGA, a DSP, a GPU, or the like is mounted or an external apparatus, such as a personal computer (PC).

The display unit 119 is constituted by a display panel made of liquid crystal, organic electro luminescence (EL), or the like. The display unit 119 displays an image corresponding to image data generated by the image sensor 105.

Configuration of Lens Unit

As illustrated in FIG. 24, the lens unit 4 forms, on the image sensor 105, an image of a subject using light collected from a predetermined field of view. The lens unit 4 includes the optical system 101, the diaphragm 102, and the driver 104.

Processing Performed by Imaging System

Figure 25:
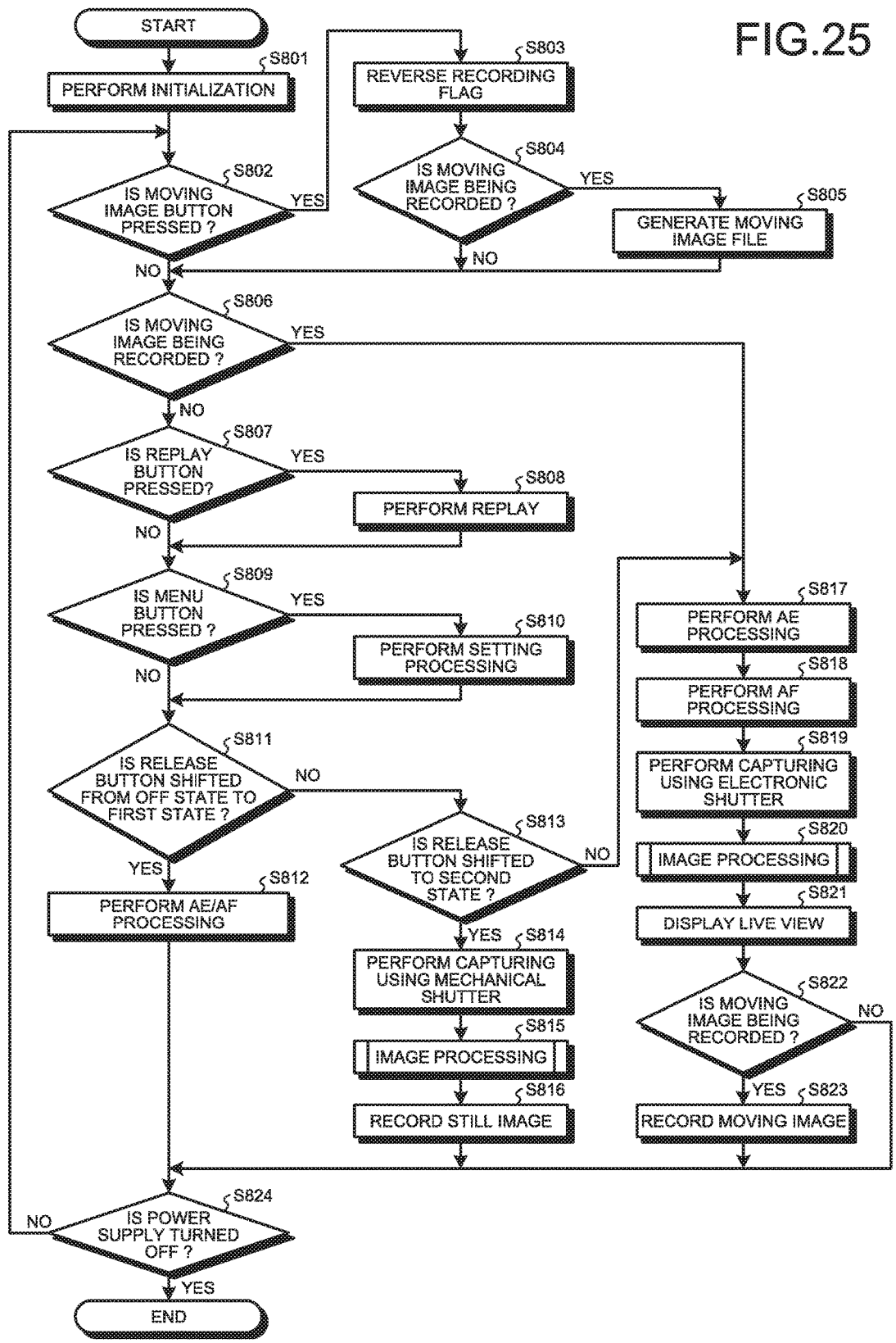
FIG. 25 is a flowchart illustrating an outline of processing performed by the imaging system according to the fifth embodiment of the disclosure.

Next, processing performed by the imaging system 2 will be described. FIG. 25 is a flowchart illustrating an outline of the processing performed by the imaging system 2.

As illustrated in FIG. 25, first, when a user operates a power button (not illustrated) of the operating unit 108 to turn on a power supply of the main body 3, the imaging controller 114 initializes the imaging system 2 (Step S801). Specifically, the imaging controller 114 performs initialization to turn off a recording flag indicating that a moving image is being recorded. The recording flag is a flag that is turned on when a moving image is being captured and that is turned off when a moving image is not being captured, and is stored in the volatile memory 111.

Subsequently, when a moving image button of the operating unit 108 is pressed (Step S802: Yes), the imaging controller 114 reverses the recording flag indicating that a moving image is being recorded in an ON state (Step S803), and the imaging controller 114 determines whether the imaging system 2 is recording a moving image (Step S804). Specifically, the imaging controller 114 determines whether the recording flag recorded in the volatile memory 111 is in the ON state. When the imaging controller 114 determines that the imaging system 2 is recording a moving image (Step S804: Yes), the imaging system 2 proceeds to Step S805 to be described below. In contrast, when the imaging controller 114 determines that the imaging system 2 is not recording a moving image (Step S804: No), the imaging system 2 proceeds to Step S806 to be described below.

At Step S805, the imaging controller 114 generates a moving image file for recording image data in the recording medium 110 in chronological order. After Step S805, the imaging system 2 proceeds to Step S806 to be described below.

At Step S802, when the moving image button of the operating unit 108 is not pressed (Step S802: No), the imaging system 2 proceeds to Step S806.

Subsequently, the imaging controller 114 determines whether the imaging system 2 is recording a moving image (Step S806). When the imaging controller 114 determines that the imaging system 2 is recording a moving image (Step S806: Yes), the imaging system 2 proceeds to Step S817 to be described below. In contrast, when the imaging controller 114 determines that the imaging system 2 is not recording a moving image (Step S806: No), the imaging system 2 proceeds to Step S807 to be described below.

At Step S807, when a replay button of the operating unit 108 is pressed (Step S807: Yes), the imaging system 2 reproduces and displays an image corresponding to the image data recorded in the recording medium 110 on the display unit 119 (Step S808). After Step S808, the imaging system 2 proceeds to Step S809 to be described below.

At Step S807, when the replay button of the operating unit 108 is not pressed (Step S807: No), the imaging system 2 proceeds to Step S809.

Subsequently, when a menu button of the operating unit 108 is pressed (Step S809: Yes), the imaging system 2 performs setting processing for performing various settings (Step S810). After Step S810, the imaging system 2 proceeds to Step S811 to be described below.

At Step S809, when the menu button of the operating unit 108 is not pressed (Step S809: No), the imaging system 2 proceeds to Step S811.

At Step S811, when a release button of the operating unit 108 is shifted from an OFF state to a first state (Step S811: Yes), the imaging controller 114 causes the AE processing unit 116 to perform AE processing for adjusting exposure and causes the AF processing unit 117 to perform AF processing for adjusting focus (Step S812). Thereafter, the imaging system 2 proceeds to Step S824 to be described below.

At Step S811, when the release button of the operating unit 108 is not shifted from the OFF state to the first state (Step S811: No), the imaging system 2 proceeds to Step S813.

Subsequently, when the release button of the operating unit 108 is shifted to a second state (Step S813: Yes), the imaging controller 114 performs capturing using a mechanical shutter (Step S814). Specifically, the imaging controller 114 controls the shutter 103 and causes the image sensor 105 to perform capturing.

Subsequently, the imaging system 2 corrects RTS noise on the image data generated by the image sensor 105, and performs image processing for performing predetermined processing (Step S815). Details of the image processing will be described later.

Thereafter, the imaging controller 114 records, in the recording medium 110, the image data on which the image processing has been performed by the image processing unit 33 (Step S816). After Step S816, the imaging system 2 proceeds to Step S824 to be described below.

At Step S813, when the release button of the operating unit 108 is not shifted to the second state (Step S813: No), the imaging system 2 proceeds to Step S817.

Subsequently, the imaging controller 114 causes the AE processing unit 116 to perform AE processing for adjusting exposure (Step S817), and causes the AF processing unit 117 to perform AF processing for adjusting focus (Step S818).

Thereafter, the imaging controller 114 causes the image sensor 105 to perform capturing using a so-called electronic shutter that electronically controls exposure time, via the driver 120 (Step S819). The image data generated by the image sensor 105 through the capturing using the electronic shutter is output to the volatile memory 111 via the analog processing unit 106, the A/D converter 107, and the bus 113.

Subsequently, the imaging system 2 performs the same image processing as the processing performed at Step S815 (Step S820). Details of the image processing will be described later.

Thereafter, the imaging system 2 causes the display unit 119 to display a live view image corresponding to the image data that is generated by the image sensor 105 through the capturing using the electronic shutter (Step S821).

Subsequently, when the imaging system 2 is recording a moving image (Step S822: Yes), the imaging controller 114 causes an image compression/decompression unit (not illustrated) to compress the image data in a recording format set through the setting processing at Step S810, and records the compressed image data as a moving image in a moving image file generated in the recording medium 110 (Step S823). After Step S823, the imaging system 2 proceeds to Step S824.

At Step S822, when the imaging system 2 is not recording a moving image (Step S822: No), the imaging system 2 proceeds to Step S824.

Subsequently, when the power button of the operating unit 108 is pressed and the power supply of the imaging system 2 is turned off (Step S824: Yes), the imaging system 2 ends the processing. In contrast, when the power supply of the imaging system 2 is not turned off (Step S824: No), the imaging system 2 returns to Step S802.

Outline of Image Processing

Figure 26:
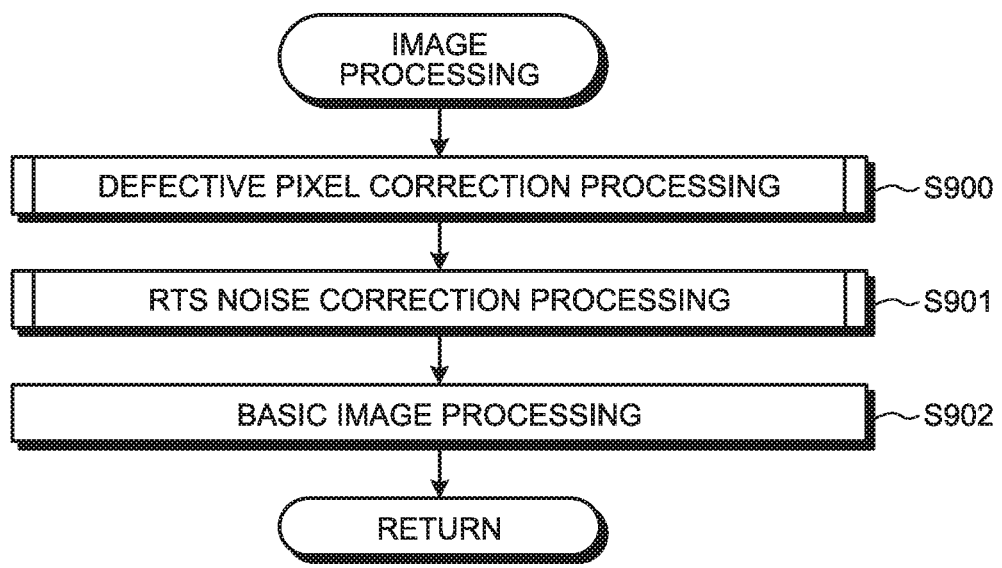
FIG. 26 is a flowchart illustrating an outline of image processing in FIG. 25.
Figure 27:
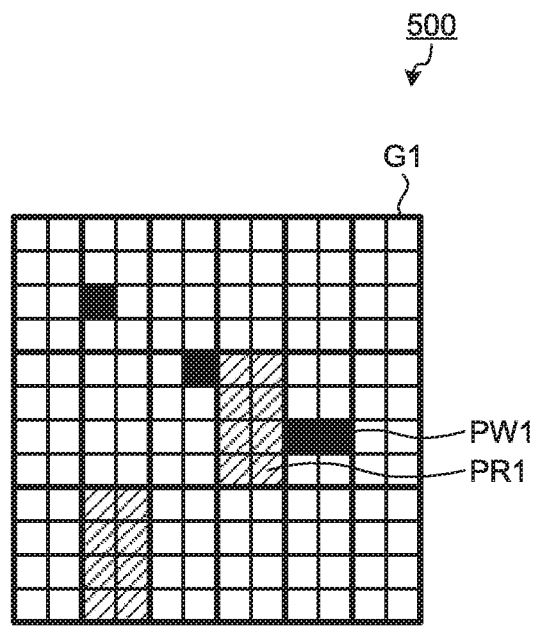
FIG. 27 is a diagram schematically illustrating an example of each of pixels of an image sensor including a defective pixel and a blinking defective pixel.

Next, the image processing described at Step S815 and Step S820 in FIG. 25 will be described. FIG. 26 is a flowchart illustrating an outline of the image processing.

As illustrated in FIG. 26, the defective pixel correction unit 50 performs defective pixel correction processing for correcting defective pixel noise in the image data generated by the image sensor 105 (Step S900). Here, the defective pixel correction processing corresponds to the processing performed by the image processing apparatus 30 according to the first, the third, and the fourth embodiments described above; therefore, explanation thereof will be omitted.

Subsequently, the RTS noise correction unit 51 performs RTS noise correction processing for correcting RTS noise in the image data that has been corrected by the defective pixel correction unit 50 (Step S901). Here, the RTS noise correction processing corresponds to the processing performed by the image processing apparatus 30 according to the first, the third, and the fourth embodiments described above; therefore, explanation thereof will be omitted.

Subsequently, the image processing unit 33 performs basic image processing on the image data in which the RTS noise has been corrected by the RTS noise correction unit 51 (Step S902). After Step S902, the imaging system 2 returns to the main routine in FIG. 25.

According to the fifth embodiment of the disclosure as described above, it is possible to achieve the same effects as those of the first embodiment described above.

Other Embodiments

The disclosure is not limited to the embodiments as described above, and various modifications and applications are of course possible within the scope of the gist of the disclosure. For example, in addition to the imaging apparatus used in the description of the disclosure, the disclosure may be applied to any device capable of capturing an image of a subject, such as a portable device with an image sensor in a mobile phone or a smartphone, an imaging apparatus capable of capturing an image of a subject through an optical system, such as a video camera, an endoscope, a surveillance camera, or a microscope, and the like.

In the embodiment, the reference value of the random noise model and the noise model to be referred to are changed depending on RTS_Value that is feature data of RTS noise or depending on the maximum value of the candidate values based on RTS_Value. However, it may be possible to combine these values, select a random noise model in accordance with the feature data of the RTS noise, and estimate the random noise amount by changing the reference value. Furthermore, because the random noise amount fluctuates depending on temperature, it may be possible to select a random noise model depending on temperature of the image sensor at the time of capturing image data, and then apply the above-described method.

Moreover, in the embodiments, the RTS noise information recording unit and the defective pixel information recording unit are provided inside the imaging apparatus; however, the RTS noise information recording unit may be provided inside the image processing apparatus or the lens unit as described above, may be provided in a main body of an endoscope or the like, or may be provided in a server capable of performing bidirectional communication via a network, and acquire the RTS noise information via the network.

Furthermore, the disclosed technology may be applied to image data other than image data used for display or recording; for example, the disclosed technology may be applied to image data of an OB region or image data of a region outside an image circle for which optical design assurance is not ensured.

Moreover, in the explanation of each operation flowchart described above in this document, the operations are described using "first", "then", "subsequently", "thereafter", and the like; however, this does not mean that it is necessary to perform the operations in this order.

In addition, each of the processing methods by the image processing apparatus according to the embodiments described above, that is, the processing described in each flowchart, may be stored as a program that can be executed by a controller, such as a CPU. Furthermore, each processing may be stored in a storage medium of an external storage device, such as a memory card (a ROM card, a RAM card, or the like), a magnetic disk (a floppy (registered trademark) disk, a hard disk, or the like), an optical disk (a CD-ROM, a DVD, or the like), or a semiconductor memory, and then distributed. Then, the controller, such as a CPU, reads the program stored in the storage medium of the external storage device, and the operations are controlled by the read program, so that the above-described processing can be executed.

According to some embodiments, it is possible to correct a defective pixel and a blinking defective pixel with high accuracy in image data generated by an image sensor including a defective pixel and a blinking defective pixel.

The disclosure is not limited to the above-described embodiments and modifications as they are. In the implementation stage, the disclosure may be embodied with various modifications of the constituent elements within the scope not departing from the gist of the disclosure. In addition, various inventions may be made by appropriately combining a plurality of constituent elements disclosed in the above embodiments. For example, some constituent elements may be deleted from all of the constituent elements described in the embodiments and the modifications described above. Furthermore, the constituent elements described in the embodiments and the modifications may be appropriately combined.

Moreover, in the specification or the drawings, a term that is at least once described together with a different term having a broader meaning or the same meaning may be replaced with the different term at any point in the specification or the drawings. Thus, various modifications and applications may be made without departing from the scope of the invention.

What is claimed is:

1. An image processing apparatus
    for correcting blinking defect noise in image data generated by an image sensor, the image sensor comprising:
        a plurality of pixels arranged two-dimensionally and configured to receive light from outside to generate a signal according to an amount of the received light; and
        a plurality of reading circuits configured to read the signal as a pixel value, and
    for correcting defective pixel noise in the image data, the defective pixel noise being different from the blinking defect noise and occurring according to positions of the plurality of pixels,
the image processing apparatus comprising:
    a processor comprising hardware, wherein the processor is configured to:
        acquire:
            defective pixel information including one of positional information on a reading circuit, of the plurality of reading circuits, in which the defective pixel noise occurs and positional information on each of the plurality of pixels,
            blinking defect noise information including one of positional information on a reading circuit, of the plurality of reading circuits, in which the blinking defect noise occurs and the positional information on each of the plurality of pixels, and
            the image data generated by the image sensor;
        correct the blinking defect noise in the image data based on the defective pixel information and the blinking defect noise information; and
        correct the defective pixel noise in the image data, in which the blinking defect noise has been corrected, based on the defective pixel information.

2. The image processing apparatus according to claim 1, wherein the processor is configured to correct the defective pixel noise by using pixel values of pixels except for a pixel which is included in the blinking defect noise information and at which the blinking defect noise is likely to occur.

3. The image processing apparatus according to claim 2, wherein the processor is configured to correct the defective pixel noise while excluding a pixel value of a pixel for which a difference between a pixel value of a pixel, which is included in the blinking defect noise information and at which the blinking defect noise is likely to occur, and a pixel value of each of neighboring pixels of the certain pixel is equal to or larger than a predetermined threshold.

4. The image processing apparatus according to claim 1, wherein the blinking defect noise information further includes feature data, which is associated with one of the positional information on the reading circuit in which the blinking defect noise occurs and the positional information on each of the pixels and which is based on a noise level of the blinking defect noise, and
wherein the processor is configured to, when a pixel at which the blinking defect noise is likely to occur and which is included in the blinking defect noise information is present around the defective pixel noise, correct the defective pixel noise by using a pixel value that is obtained by correcting a pixel value of the pixel at which the blinking defect noise is likely to occur based on the feature data.

5. The image processing apparatus according to claim 1, wherein the blinking defect noise is a random telegraph signal noise.

6. An image processing apparatus
    for correcting blinking defect noise in image data generated by an image sensor, the image sensor comprising:
        a plurality of pixels arranged two-dimensionally and configured to receive light from outside to generate a signal according to an amount of the received light; and
        a plurality of reading circuits configured to read the signal as a pixel value, and
    for correcting defective pixel noise in the image data, the defective pixel noise being different from the blinking defect noise and occurring according to positions of the plurality of pixels,
the image processing apparatus comprising:
    a processor comprising hardware, wherein the processor is configured to:
        acquire:
            defective pixel information including one of positional information on a reading circuit, of the plurality of reading circuits, in which the defective pixel noise occurs and positional information on each of the plurality of pixels, blinking defect noise information including one of positional information on a reading circuit, of the plurality of reading circuits, in which the blinking defect noise occurs and the positional information on each of the plurality of pixels, and the image data generated by the image sensor;

correct the blinking defect noise in the image data based on the defective pixel information and the blinking defect noise information; and correct the defective pixel noise in the image data, in which the blinking defect noise has been corrected, based on the defective pixel information.

7. The image processing apparatus according to claim 6, wherein the blinking defect noise information further includes feature data, which is associated with one of the positional information on the reading circuit in which the blinking defect noise occurs and the positional information on each of the pixels and which is based on a noise level of the blinking defect noise, and wherein the processor is configured to, when a pixel at which the blinking defect noise is likely to occur and which is included in the blinking defect noise information is present around the defective pixel noise, correct the defective pixel noise by using a pixel value that is obtained by correcting a pixel value of the pixel at which the blinking defect noise is likely to occur based on the feature data.

8. The image processing apparatus according to claim 6, wherein the processor is configured to correct the blinking defect noise by using a pixel value of a pixel except for a pixel which is included in the defective pixel information and at which the defective pixel noise occurs.

9. The image processing apparatus according to claim 8, wherein the processor is configured to:

calculate a representative value of a pixel of interest from a pixel value of a pixel except for a pixel which is included in the defective pixel information and at which the defective pixel noise occurs; and correct the blinking defect noise so as to approach the representative value.

10. An image processing apparatus for correcting blinking defect noise in image data generated by an image sensor, the image sensor comprising:

a plurality of pixels arranged two-dimensionally and configured to receive light from outside to generate a signal according to an amount of the received light; and a plurality of reading circuits configured to read the signal as a pixel value, and for correcting defective pixel noise in the image data, the defective pixel noise being different from the blinking defect noise and occurring according to positions of the plurality of pixels, the image processing apparatus comprising:

a processor comprising hardware, wherein the processor is configured to:

acquire:
defective pixel information including one of positional information on a reading circuit, of the plurality of reading circuits, in which the defective pixel noise occurs and positional information on each of the plurality of pixels, blinking defect noise information including one of positional information on a reading circuit, of the plurality of reading circuits, in which the blinking defect noise occurs and the positional information on each of the plurality of pixels, and the image data generated by the image sensor;

correct the defective pixel noise in the image data based on the defective pixel information and the blinking defect noise information;

correct the blinking defect noise in the image data based on the defective pixel information and the blinking defect noise information;

when the defective pixel noise occurs at a pixel of interest in an image corresponding to the image data based on the defective pixel information and the blinking defect noise information, output a result obtained by correcting a pixel value of the pixel of interest; and when the blinking defect noise occurs at the pixel of interest, output a result obtained by correcting the pixel value of the pixel of interest, wherein the processor is configured to correct the blinking defect noise by using a pixel value of a pixel except for a pixel which is included in the defective pixel information and at which the defective pixel noise occurs, and wherein the processor is configured to calculate a representative value of the pixel of interest from the pixel value of the pixel except for the pixel which is included in the defective pixel information and at which the defective pixel noise occurs, and correct the blinking defect noise so as to approach the representative value.

11. The image processing apparatus according to claim 10, wherein the blinking defect noise information further includes feature data, which is associated with one of the positional information on the reading circuit in which the blinking defect noise occurs and the positional information on each of the pixels and which is based on a noise level of the blinking defect noise, and wherein the processor is configured to, when a pixel at which the blinking defect noise is likely to occur and which is included in the blinking defect noise information is present around the defective pixel noise, correct the defective pixel noise by using a pixel value that is obtained by correcting a pixel value of the pixel at which the blinking defect noise is likely to occur based on the feature data.

12. An image processing method for correcting blinking defect noise in image data generated by an image sensor, the image sensor comprising:

a plurality of pixels arranged two-dimensionally and configured to receive light from outside to generate a signal according to an amount of the received light; and a plurality of reading circuits configured to read the signal as a pixel value, and for correcting defective pixel noise in the image data, the defective pixel noise being different from the blinking defect noise and occurring according to positions of the plurality of pixels, the image processing method comprising:

acquiring:
defective pixel information including one of positional information on a reading circuit, of the plurality of reading circuits, in which the defective pixel noise occurs and positional information on each of the plurality of pixels;

blinking defect noise information including one of positional information on a reading circuit, of the plurality of reading circuits, in which the blinking defect noise occurs and the positional information on each of the plurality of pixels; and the image data generated by the image sensor;

correcting the defective pixel noise in the image data based on the defective pixel information and the blinking defect noise information; and correcting the blinking defect noise in the image data, in which the defective pixel noise has been corrected, based on the blinking defect noise information.

13. A non-transitory computer-readable recording medium recording a program for correcting blinking defect noise in image data generated by an image sensor, the image sensor comprising:

a plurality of pixels arranged two-dimensionally and configured to receive light from outside to generate a signal according to an amount of the received light; and a plurality of reading circuits configured to read the signal as a pixel value, and for correcting defective pixel noise in the image data, the defective pixel noise being different from the blinking defect noise and occurring according to positions of the plurality of pixels, the program causing a computer to at least execute:

acquiring:

defective pixel information including one of positional information on a reading circuit, of the plurality of reading circuits, in which the defective pixel noise occurs and positional information on each of the plurality of pixels;

blinking defect noise information including one of positional information on a reading circuit, of the plurality of reading circuits, in which the blinking defect noise occurs and the positional information on each of the plurality of pixels; and the image data generated by the image sensor;

correcting the defective pixel noise in the image data based on the defective pixel information and the blinking defect noise information; and correcting the blinking defect noise in the image data, in which the defective pixel noise has been corrected, based on the blinking defect noise information.

* * * * *